(12) United States Patent
Cho et al.

(10) Patent No.: US 12,542,569 B2
(45) Date of Patent: Feb. 3, 2026

(54) DUAL CONNECTION CIRCUIT AND ELECTRONIC DEVICE INCLUDING SAME

(71) Applicant: SAMSUNG ELECTRONICS CO., LTD., Suwon-si (KR)

(72) Inventors: Namjun Cho, Suwon-si (KR); Jooseung Kim, Suwon-si (KR); Hyoseok Na, Suwon-si (KR); Hyunseok Choi, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 743 days.

(21) Appl. No.: 17/896,500

(22) Filed: Aug. 26, 2022

(65) Prior Publication Data

US 2022/0416820 A1    Dec. 29, 2022

Related U.S. Application Data

(63) Continuation of application No. PCT/KR2021/002267, filed on Feb. 23, 2021.

(30) Foreign Application Priority Data

Feb. 26, 2020    (KR) .................. 10-2020-0023438

(51) Int. Cl.
*H04W 4/00*     (2018.01)
*H04B 1/00*     (2006.01)
(Continued)

(52) U.S. Cl.
CPC ......... *H04B 1/0078* (2013.01); *H04B 1/1607* (2013.01); *H04B 1/18* (2013.01); *H04B 2001/0408* (2013.01)

(58) Field of Classification Search
CPC ...... H04B 1/525; H04B 1/0064; H04B 1/401; H04B 1/0078
See application file for complete search history.

(56) References Cited

U.S. PATENT DOCUMENTS

| 9,124,355 B2 | 9/2015 | Black et al. |
| 2003/0022631 A1 | 1/2003 | Rhodes et al. |

(Continued)

FOREIGN PATENT DOCUMENTS

| EP | 3471278 | 4/2019 |
| KR | 10-1963275 | 3/2019 |
| WO | 2015/108897 | 7/2015 |

OTHER PUBLICATIONS

Korean Office Action issued Nov. 8, 2023 in corresponding Korean Patent Application No. 10-2020-0023438.

(Continued)

*Primary Examiner* — Omoniyi Obayanju
(74) *Attorney, Agent, or Firm* — Nixon & Vanderhye, P.C.

(57) ABSTRACT

Various embodiments of the disclosure disclose a method and apparatus, comprising: a communication processor; a radio frequency integrated circuit (RFIC) connected to the communication processor and outputting at least one of a first radio frequency signal, a second radio frequency signal, a third radio frequency signal, and a fourth radio frequency signal; a first circuit connected to the RFIC and including a first filter; a first radio frequency front end (RFFE) connected to the first circuit and including a first amplifier configured to amplify the first radio frequency signal and/or the third radio frequency signal; and a second RFFE including a second amplifier configured to amplify the second radio frequency signal and/or the fourth radio frequency signal output from the RFIC, wherein the communication processor is configured to control the first circuit to remove the fourth radio frequency signal induced to the first circuit through the first filter.

20 Claims, 15 Drawing Sheets

(51) Int. Cl.
    *H04B 1/16*   (2006.01)
    *H04B 1/18*   (2006.01)
    *H04B 1/04*   (2006.01)

(56) References Cited

U.S. PATENT DOCUMENTS

| | | | |
|---|---|---|---|
| 2009/0180403 A1* | 7/2009 | Tudosoiu | H04B 1/406 |
| | | | 370/278 |
| 2011/0165848 A1* | 7/2011 | Gorbachov | H04B 1/0064 |
| | | | 455/78 |
| 2013/0148636 A1 | 6/2013 | Lum et al. | |
| 2013/0225107 A1 | 8/2013 | Lane et al. | |
| 2014/0055210 A1 | 2/2014 | Black et al. | |
| 2015/0200690 A1 | 7/2015 | Youssef et al. | |
| 2016/0164568 A1 | 6/2016 | Kim | |
| 2017/0194915 A1 | 7/2017 | Wimpenny | |
| 2017/0212721 A1 | 7/2017 | Satoskar et al. | |
| 2017/0302328 A1 | 10/2017 | Obiya et al. | |
| 2018/0131501 A1 | 5/2018 | Little | |
| 2018/0337643 A1 | 11/2018 | Yoshimi | |
| 2018/0367177 A1 | 12/2018 | Ramasamy et al. | |
| 2019/0182902 A1 | 6/2019 | Han et al. | |

OTHER PUBLICATIONS

International Search Report for PCT/KR2021/002267, mailed Jun. 11, 2021, 4 pages.
Written Opinion of the ISA for PCT/KR2021/002267, mailed Jun. 11, 2021, 4 pages.

* cited by examiner

DUAL CONNECTION CIRCUIT AND ELECTRONIC DEVICE INCLUDING SAME

CROSS-REFERENCE TO RELATED APPLICATIONS

This application is a continuation of International Application No. PCT/KR2021/002267 designating the United States, filed on Feb. 23, 2021, in the Korean Intellectual Property Receiving Office and claiming priority to Korean Patent Application No. 10-2020-0023438, filed on Feb. 26, 2020, in the Korean Intellectual Property Office, the disclosures of which are incorporated by reference herein in their entireties.

BACKGROUND

Field

The disclosure relates to a dual connectivity circuit and an electronic device including the same.

Description of Related Art

A transmission signal (for example, Tx signal) transmitted to the outside through an antenna of an electronic device may be generated by a communication processor and transferred to a radio frequency integrated circuit (RFIC). The RFIC may up-convert a baseband signal received from the communication processor to a radio frequency signal and may transfer the same to a radio frequency front end (RFFE) (for example, Tx module). The radio frequency signal transferred to the RFFE may be amplified by an amplifier (for example, power amplifier (PA)) included in the RFFE and may be output to the outside through an antenna as a transmission signal. A reception signal (for example, Rx signal) received from the outside through the antenna of the electronic device may be amplified by a low noise amplifier (LNA) included in the RFFE and then transferred to the RFIC. The RFIC may down-convert the reception signal to a baseband signal, contrary to the transmission signal, and may transfer the same to the communication processor.

In a wireless communication system, amplification is necessary only with regard to a carrier signal of one of 2nd generation (2G), 3G, or 4G, and the RFIC may thus include a single local oscillator (LO) such that a baseband signal is up-converted to a radio frequency signal by the LO. In line with development of wireless communication, there has been an increasing demand for a higher peak data rate. As a result, there is a demand for uplink carrier aggregation (ULCA), and the RFIC may thus include one or more local oscillators.

In a 4G network, ULCA may be generally used to improve the uplink data rate. A 5G network may use E-UTRA/NR Dual Connectivity (ENDC) technology to support communication at a higher data rate than ULCA. ENDC needs to support, through re-farming, not only an ultra high band (UHB) (for example, 3.3 GHz-5 GHz), but also a low band (LB) (for example, 600 MHz-1 GHz) which is a legacy band, a mid band (MB) (for example, 1.5 GHz-2.2 GHz), or a high band (HB) (for example, 2.3 GHz-2.7 GHz), and, compared with the prior art, tens of times 2 Tx scenarios may occur.

If a switch used to transfer a signal (for example, transmission signal) from the RFIC to the RFFE has small isolation, sensitivity degradation may occur in connection with a specific scenario. The RFIC is a very small-sized module of a flip chip-ball grid array (FC-BGA) or wafer level chip scale package (WLCSP) type, the distance between respective ports is very small, and it may be difficult to secure isolation between inner ports. In addition, the insertion loss (IL) of the witch may affect the gain performance of the overall Tx performance. It may be difficult to secure high isolation performance in the case of a small size (for example, RFIC). If switch isolation cannot be secure, sensitivity degradation may occur.

Switch isolation may be determined by the distance between ports of the switch. The larger the distance between ports, the higher the isolation between ports. However, the component size may increase if the distance between ports is increased to raise the isolation between ports. Alternatively, the switch inner implementation structure may be changed to raise the isolation between ports while maintaining the distance between ports. In this case, the switch has an increased number of transistors therein. As a result, the switch making process may be complicated, the switch size may increase, or the insertion loss may increase. Alternatively, the output power of the RFIC or the gain of the amplifier included in the RFFE needs to be increased to increase the transmission signal power. This may degrade current consumption and linearity of the electronic device. 5G communication has a widened signal bandwidth to support higher data rate than 4G communication systems, and has a complicated signal modulation scheme, thereby increasing the peak to average power ratio (PAPR). Therefore, it may be difficult to increase the output power of the RFIC, in order to increase the transmission signal power, or to increase the gain of the amplifier included in the RFFE.

For example, if an RFIC (for example, transceiver) has insufficient isolation on two different communication paths which are input to a first RFFE (for example, Tx module) and a second RFFE, respectively, a transmission signal input to the second RFFE may be induced on the communication path connected to the first RFFE. For example, if the induced transmission signal overlaps the frequency band of a reception signal, or in the case of a signal having an adjacent frequency, the same may act as spurious (noise) on the reception signal, thereby degrading the reception performance. Alternatively, the induced transmission signal may pass through the amplifier included in the first RFFE together with a designated transmission signal, and the two transmission signals may generate an intermodulation distortion (IMD) signal, thereby affecting the reception signal.

SUMMARY

Embodiments of the disclosure may provide a method and a device wherein, when a fourth radio frequency signal (for example, transmission signal) input from an RFIC to a second RFFE is induced on a path of input from the RFIC to a first RFFE, the fourth radio frequency signal is removed through a filter such that a first radio frequency signal can solely be input to the first RFFE.

An electronic device according to various example embodiments may include: a communication processor, a radio frequency integrated circuit (RFIC) connected to the communication processor and configured to output at least one of: a first radio frequency signal, a second radio frequency signal, a third radio frequency signal, and a fourth radio frequency signal, a first circuit connected to the RFIC and including a first filter, a first radio frequency front end (RFFE) connected to the first circuit and a first amplifier configured to amplify the first radio frequency signal or the third radio frequency signal, and a second RFFE including a second amplifier configured to amplify the second radio frequency signal and/or the fourth radio frequency signal output from the RFIC, wherein the communication processor is configured to control the first circuit to remove the fourth radio frequency signal induced to the first circuit, through the first filter.

An electronic device according to various example embodiments may include: a communication processor, a radio frequency integrated circuit (RFIC) connected to the communication processor and configured to output at least one of: a first radio frequency signal, a second radio frequency signal, a third radio frequency signal, and a fourth radio frequency signal, a first circuit connected to the RFIC and including a first filter, a first radio frequency front end (RFFE) connected to the first circuit and including a first amplifier and/or a second amplifier configured to amplify the first radio frequency signal and/or the third radio frequency signal, and a second RFFE including a third amplifier and/or a fourth amplifier configured to amplify the second radio frequency signal and/or the fourth radio frequency signal output from the RFIC, wherein the communication processor is configured to control the first circuit to remove the fourth radio frequency signal induced to the first circuit, through the first filter.

According to various example embodiments, when a fourth radio frequency signal input from an RFIC to a second RFFE is induced on a path of input from the RFIC to a first RFFE, the fourth radio frequency signal is removed through a filter such that a first radio frequency signal can solely be input to the first RFFE, thereby preventing/reducing reception performance degradation by the fourth radio frequency signal.

According to various example embodiments, an RFFE includes a filter to remove a transmission signal that affects the reception performance, thereby securing designated isolation between ports for input to the RFFE.

According to various example embodiments, when two different radio frequency signals are transmitted simultaneously, the two different radio frequency signals can be transmitted without degrading the reception performance.

According to various example embodiments, an RFFE including one or more amplifiers includes a filter or a switch such that signals that may degrade the reception performance can be reduced.

BRIEF DESCRIPTION OF THE DRAWINGS

The above and other aspects, features and advantages of certain embodiments of the present disclosure will be more apparent from the following detailed description, taken in conjunction with the accompanying drawings, in which.

DETAILED DESCRIPTION

Figure 1:
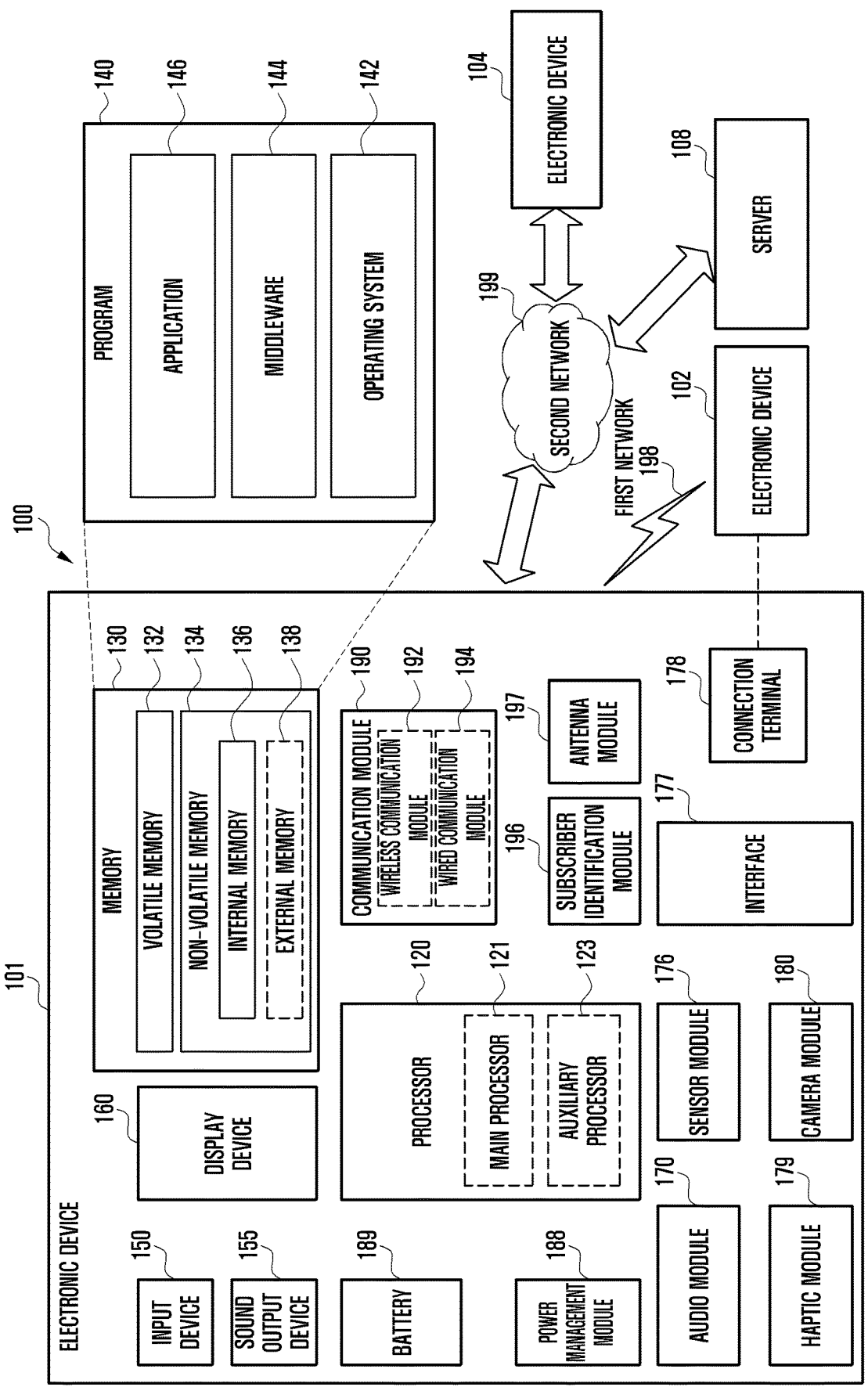
FIG. 1 is a block diagram illustrating an example electronic device in a network environment according to various embodiments.

The electronic device according to various embodiments may be one of various types of electronic devices. The electronic devices may include, for example, a portable communication device (e.g., a smart phone), a computer device, a portable multimedia device, a portable medical device, a camera, a wearable device, a home appliance, or the like. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), the element may be coupled with the other element directly (e.g., wiredly), wirelessly, or via a third element.

As used herein, the term "module" may include a unit implemented in hardware, software, or firmware, or any combination thereof, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

FIG. 1 is a block diagram illustrating an example electronic device 101 in a network environment 100 according to various embodiments.

Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In various embodiments, at least one (e.g., the display device 160 or the camera module 180) of the components may be omitted from the electronic device 101, or one or more other components may be added in the electronic device 101. In various embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to an embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, or a keyboard.

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector), The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to an embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include one antenna including a conductor formed on a substrate (eg, a PCB) or a radiator formed of a conductive pattern. According to an embodiment, the antenna module 197 may include a plurality of antennas. In this case, at least one antenna appropriate for a communication scheme used in a communication network such as the first network 198 or the second network 199, for example, by the communication module 190 can be selected from the plurality of antennas. A signal or power may be transmitted or received between the communication module 190 and an external electronic device through the selected at least one antenna. According to various embodiments, other components (eg, RFIC) other than the radiator may be additionally formed as a part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. Wherein, the "non-transitory" storage medium is a tangible device, and may not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 2:
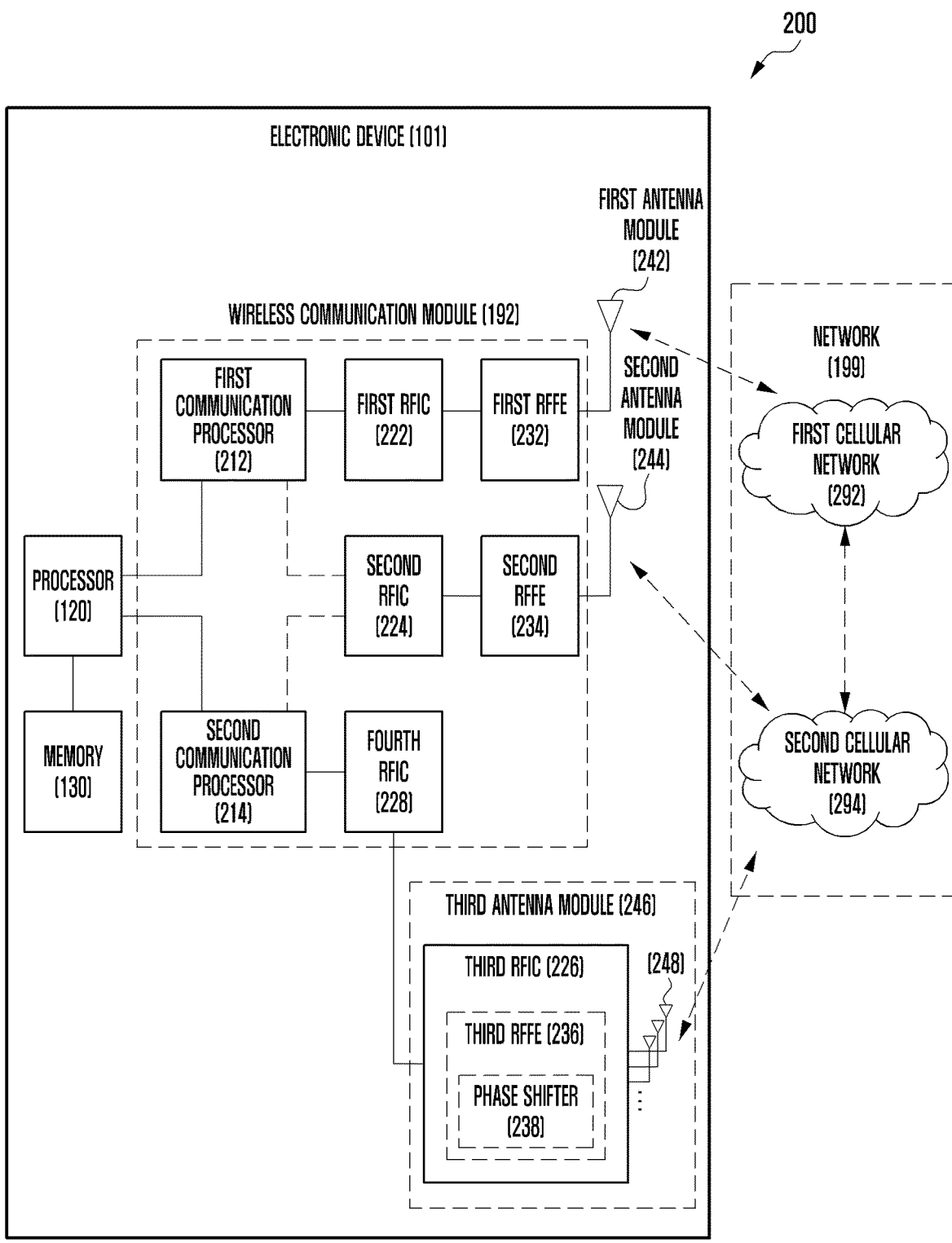
FIG. 2 is a block diagram illustrating an example configuration of an electronic device for supporting legacy network communication and 5G network communication according to various embodiments.

FIG. 2 is a block diagram 200 illustrating an example configuration of an electronic device 101 for supporting legacy network communication and 5G network communication according to various embodiments.

Referring to FIG. 2, the electronic device 101 may include a first communication processor (e.g., including processing circuitry) 212, a second communication processor (e.g., including processing circuitry) 214, a first radio frequency integrated circuit (RFIC) 222, a second RFIC 224, a third RFIC 226, a fourth RFIC 228, a first radio frequency front end (RFFE) 232, a second RFFE 234, a first antenna module 242, a second antenna module 244, and an antenna 248. The electronic device 101 may further include a processor (e.g., including processing circuitry) 120 and a memory 130.

The network 199 may include a first network 292 and a second network 294. According to an embodiment, the electronic device 101 may further include at least one component among the components illustrated in FIG. 1, and the network 199 may further include at least one different network. According to an embodiment, the first communication processor 212, the second communication processor 214, the first RFIC 222, the second RFIC 224, the fourth RFIC 228, the first RFFE 232, and the second RFFE 234 may form at least a part of the wireless communication module 192. According to an embodiment, the fourth RFIC 228 may be omitted or included as a part of the third RFIC 226.

The first communication processor 212 may include various processing circuitry and support establishment of a communication channel in a band to be used for wireless communication with the first network 292, and legacy network communication through the established communication channel. According to various embodiments, the first network may be a legacy network including a 2G, 3G, 4G, or long term evolution (LTE) network. The second communication processor 214 may include various processing circuitry and support establishment of a communication channel corresponding to a designated band (for example, about 6 GHz to about 60 GHz) among bands to be used for wireless communication with the second network 294, and 5G network communication through the established communication channel. According to various embodiments, the second network 294 may be a 5G network defined by third generation partnership project (3GPP).

Additionally, according to an embodiment, the first communication processor 212 or the second communication processor 214 may support establishment of a communication channel corresponding to another designated band (for example, about 6 GHz or lower) among the bands to be used for wireless communication with the second network 294, and 5G network communication through the established communication channel. According to an embodiment, the first communication processor 212 and the second communication processor 214 may be implemented inside a single chip or a single package. According to various embodiments, the first communication processor 212 or the second communication processor 214 may be formed inside a single chip or a single package together with a processor 120, an auxiliary processor 123, or a communication module 190.

The first RFIC 222 may convert a baseband signal generated by the first communication processor 212 into a radio frequency (RF) signal at about 700 MHz to about 3 GHz, which is used for the first network 292 (for example, legacy network), during transmission. During reception, an RF signal may be acquired from the first network 292 (for example, legacy network) through an antenna (for example, the first antenna module 242), and may be preprocessed through an RFFE, (for example, the first RFFE 232). The first RFIC 222 may convert the preprocessed RF signal into a baseband signal such that the same can be processed by the first communication processor 212.

The second RFIC 224 may convert a baseband signal generated by the first communication processor 212 or the second communication processor 214 into an RF signal in a Sub6 band (for example, about 6 GHz or lower) (hereinafter, referred to as a 5G Sub6 RF signal) that is used for the second network 294 (for example, 5G network). During reception, a 5G Sub6 RF signal may be acquired from the second network 294 (for example, 5G network) through an antenna (for example, the second antenna module 244), and may be preprocessed through an RFFE (for example, the second RFFE 234). The second RFIC 224 may convert the preprocessed 5G Sub6 RF signal into a baseband signal such that the same can be processed by a communication processor corresponding to the first communication processor 212 or the second communication processor 214.

The third RFIC 226 may convert a baseband signal generated by the second communication processor 214 into an RF signal in a 5G Above6 band (for example, about 6 GHz to about 60 GHz) (hereinafter, referred to as a 5G Above6 signal) that is to be used for the second network 294 (for example, 5G network). During reception, a 5G Above6 RF signal may be acquired from the second network 294 (for example, 5G network) through an antenna (for example, the antenna 248), and may be preprocessed through the third RFFE 236. The third RFIC 226 may convert the preprocessed 5G Above6 signal into a baseband signal such that the same can be processed by the second communication processor 214. According to an embodiment, the third RFFE 236 may be formed as a part of the third RFIC 226.

According to an embodiment, the electronic device 101 may include a fourth RFIC 228 separately from the third RFIC 226 or as at least a part thereof. In this case, the fourth RFIC 228 may convert a baseband signal generated by the second communication processor 214 into an RF signal in an intermediate frequency band (for example, about 9 GHz to about 11 GHz) (hereinafter, referred to as an IF signal) and then deliver the IF signal to the third RFIC 226. The third RFIC 226 may convert the IF signal into a 5G Above6 RF signal. During reception, a 5G Above6 RF signal may be received from the second network 294 (for example, 5G network) through an antenna (for example, antenna 248) and converted into an IF signal by the third RFIC 226. The fourth RFIC 228 may convert the IF signal into a baseband signal such that the same can be processed by the second communication processor 214.

According to an embodiment, the first RFIC 222 and the second RFIC 224 may be implemented as at least a part of a single chip or a single package. According to an embodiment, the first RFFE 232 and the second RFFE 234 may be implemented as at least a part of a single chip or a single package. According to an embodiment, at least one antenna module of the first antenna module 242 or the second antenna module 244 may be omitted or coupled to another antenna module so as to process RF signal in multiple corresponding bands.

According to an embodiment, the third RFIC 226 and the antenna 248 may be arranged on the same substrate so as to form a third antenna module 246. For example, the wireless communication module 192 or the processor 120 may be arranged on a first substrate (for example, main PCB). In this case, the third RFIC 226 may be formed on a partial area (for example, lower surface) of a second substrate (for example, sub PCB) that is separate from the first substrate, and the antenna 248 may be arranged in another partial area (for example, upper surface), thereby forming a third antenna module 246. The third RFIC 226 and the antenna 248 may be arranged on the same substrate such that the length of the transmission line between the same can be reduced. This may reduce loss (for example, attenuation) of a signal in a high-frequency band (for example, about 6 GHz to about 60 GHz) used for 5G network communication, for example, due to the transmission line. Accordingly, the electronic device 101 may improve the quality or speed of communication with the second network 294 (for example, 5G network).

According to an embodiment, the antenna 248 may be formed as an antenna array including multiple antenna elements that may be used for beamforming. In this case, the third RFIC 226 may include multiple phase shifters 238 corresponding to the multiple antenna elements, as a part of the third RFFE 236, for example. During transmission, each of the multiple phase shifters 238 may shift the phase of a 5G Above6 RF signal, which is to be transmitted to the outside (for example, base station of 5G network) of the electronic device 101, through a corresponding antenna element. During reception, each of the multiple phase shifters 238 may shift the phase of a 5G Above6 RF signal received from the outside into the same or substantially same phase through a corresponding antenna element. This enables transmission or reception through beamforming between the electronic device 101 and the outside.

The second network 294 (for example, 5G network) may be operated independently of the first network 292 (for example, legacy network) (for example, standalone (SA)), or operated while being connected thereto (for example, non-standalone (NSA)). For example, the 5G network may include only an access network (for example, 5G radio access network (RAN) or next-generation network (NG RAN)) and include no core network (for example, next-generation core (NGC)). In this case, the electronic device 101 may access the access network of the 5G network and then access an external network (for example, Internet) under the control of the core network (for example, evolved packed core (EPC)) of the legacy network. Protocol information (for example, LTE protocol network) for communication with the legacy network or protocol information (for example, new radio (NR) protocol information) for communication with the 5G network may be stored in the memory 230, and may be accessed by another component (for example, the processor 120, the first communication processor 212, or the second communication processor 214).

Figure 3A:
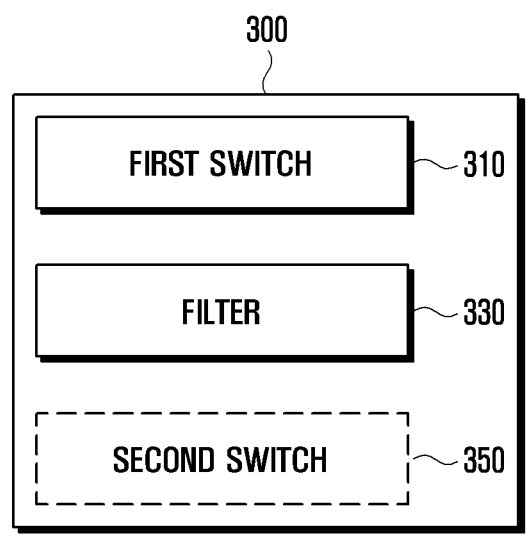
FIGS. 3A, 3B and 3C are diagrams illustrating example circuits of an electronic device according to various embodiments.
Figure 3B:
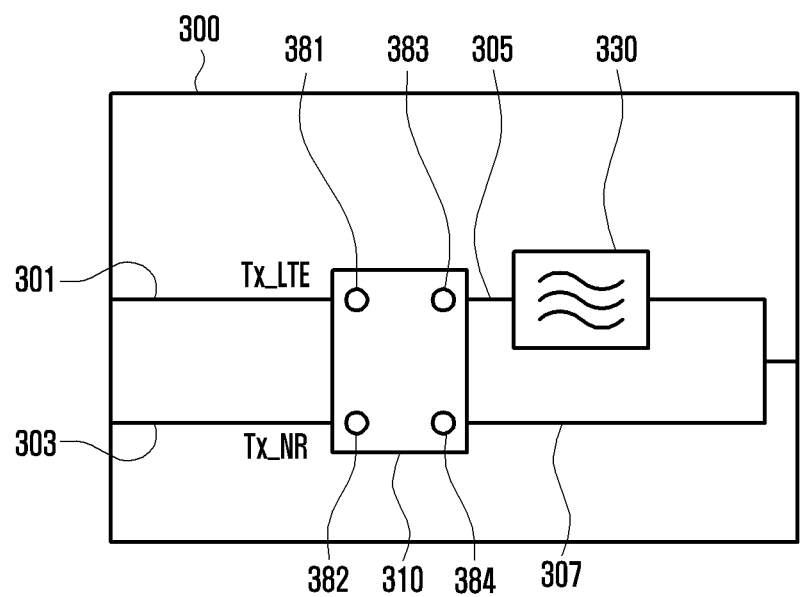
Figure 3C:
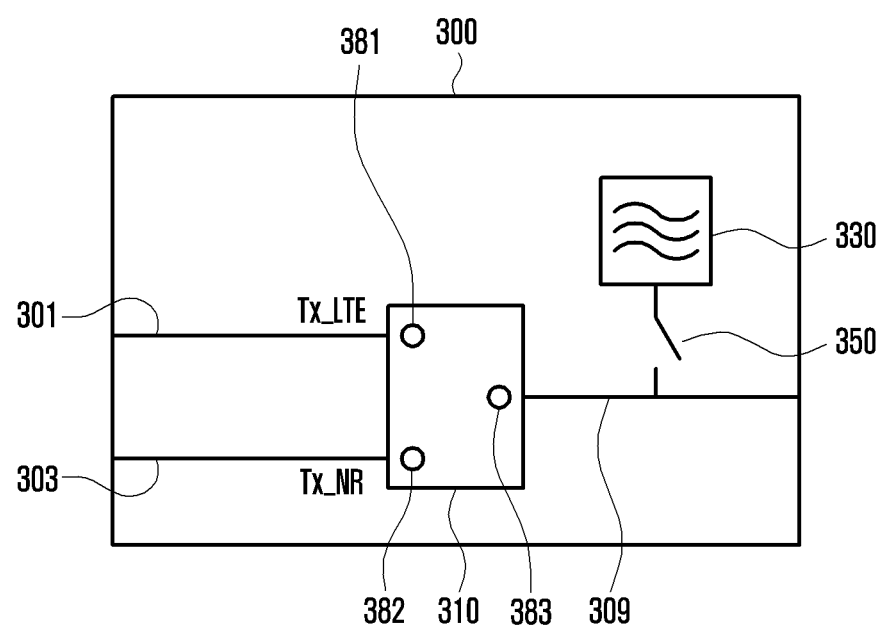

FIGS. 3A, 3B and 3C are diagrams illustrating example circuits of an electronic device according to various embodiments.

FIG. 3A is a block diagram illustrating an example circuit of an electronic device according to various embodiments.

Referring to FIG. 3A, a circuit 300 of an electronic device (e.g., the electronic device 101 of FIG. 1) according to various embodiments may include at least one switch and/or a filter on a path between a transceiver (e.g., RFIC) and an amplifier included in an RFFE, in order to prevent/reduce deterioration of reception performance, in case that a first communication radio frequency signal and a second communication radio frequency signal (e.g., two transmission signals when E-UTRA/NR dual connectivity (ENDC) is supported) are simultaneously transmitted.

For example, the at least one switch or filter may be included in one of the RFIC of FIG. 2 (e.g., the first RFIC 222 or the second RFIC 224) and the RFFE (e.g., the first RFFE 232 or the second RFFE 234) of FIG. 2. As another example, the at least one switch or filter may be placed as a separate circuit between an output port (or a terminal) for output from the RFIC and an input port for input to the RFFE (or a communication chip). The circuit 300 may include at least one of a first switch 310, a filter 330, and a second switch 350.

According to an embodiment, the 5G network may use E-UTRA/NR dual connectivity (ENDC) technology to support communication at a data rate faster than that of ULCA. The ENDC may be a technology for simultaneously transmitting a transmission signal through the first network 292 or the second network 294. The first network 292 or the second network 294 may include low band (LB) (e.g., 600 MHz to 1 GHz), mid band (MB) (e.g., 1.5 GHz to 2.2 GHz), high band (HB) (e.g., 2.3 GHz to 2.7 GHz), or ultra-high band (UHB) (e.g., 3.3 GHz to 5 GHz). In an embodiment, in case that legacy LTE frequency bands are re-farmed and used, the ENDC scenario needs to support not only UHB frequencies but also LB, MB, and HB frequencies.

Since the ULCA only needs to support a special case, an independent ULCA Tx port has been used for the RFIC, and a multi-mode multi-band (MMMB) amplifier, a duplexer, a switch, or a coupler have been used separately for the RFFE. However, when the ENDC is supported, frequencies for supporting re-farming of LB, MB, or HB may be different for each communication service provider, and thus configuration of a circuit using a duplexer and a switch outside the RFFE may increase size and cost. Accordingly, in case that the output port of the RFIC is divided into 4G (e.g., the first RFIC 222) and 5G (e.g., the second RFIC 224), and the RFFE is enabled to amplify both 4G and 5G signals, ENDC scenarios can be supported in all frequency bands without additionally using the MMMB amplifier, duplexer, switch, or coupler. Referring to FIG. 2, the first RFIC 222 and the second RFIC 224 may be configured as one circuit, and one RFIC may output different radio frequency signals to the first RFFE 232 and the second RFFE 234, respectively. Hereinafter, an example of outputting a signal from one RFIC to two different RFFEs will be described.

The RFIC may convert a baseband signal generated by a communication processor (e.g., the first communication processor 212 of FIG. 2) to a radio frequency signal, which is used in the first network 292 or the second network 294, using one or more local oscillators. The RFIC may transmit (or output) a radio frequency signal to the first RFFE or the second RFFE through different communication paths. For example, the RFIC may output a first radio frequency signal (e.g., Tx1_LTE) to a first RFFE through a first communication path, may output a second radio frequency signal (e.g., Tx2_LTE) to a second RFFE through a second communication path, may output a third radio frequency signal (e.g., Tx1_NR) to the first RFFE through a third communication path, and may output a fourth radio frequency signal (e.g., Tx2_NR) to the second RFFE through a fourth communication path.

In an embodiment, the RFIC may output the first radio frequency signal (e.g., Tx1_LTE) to a first RFFE through a first communication path, and at the same time may transmit the fourth radio frequency signal (e.g., Tx2_NR) to a second RFFE through a fourth communication path. As another example, the RFIC may output the second radio frequency signal (e.g., Tx2_LTE) to a second RFFE through a second communication path, and may simultaneously transmit the third radio frequency signal (e.g., Tx1_NR) to a first RFFE through a third communication path.

According to various embodiments, when the first radio frequency signal and the fourth radio frequency signal are simultaneously input to the first RFFE and the second RFFE, the fourth radio frequency signal may be induced on a communication path (e.g., the third communication path) connected to the first RFFE and input to the first RFFE. The induced fourth radio frequency signal may be all or a part of the fourth radio frequency signal. As another example, the first radio frequency signal may be induced on a communication path (e.g., the second communication path) connected to the second RFFE and input to the second RFFE. The first radio frequency signal may be all or part of the first radio frequency signal.

According to various embodiments, the filter 330 included in the circuit 300 may remove (or block, or reduce) a signal induced on a communication path. In an embodiment, the filter 330 may be connected to the first RFFE to remove the fourth radio frequency signal induced on the third communication path connected to the first RFFE. As another example, the filter 330 may be connected to the second RFFE to remove the first radio frequency signal which is induced on the second communication path connected to the second RFFE. According to various embodiments, the circuit 300 may be connected to one of the first RFFE and the second RFFE, or may be respectively connected to the first RFFE and the second RFFE. The first circuit may be connected to the first RFFE, and the second circuit may be connected to the second RFFE. Hereinafter, an example in which the circuit 300 is connected to the first RFFE will be described, but the disclosure is not limited by the description.

According to various embodiments, the filter 330 may include a band-pass filter (BPF), a low pass filter (LPF), a notch filter (NF), or the like. In an embodiment, when the filter 330 is implemented as a band-pass filter or a low-pass filter, the second switch 350 may be omitted. Hereinafter, a case in which the filter 330 is a band-pass filter or a low-pass filter may be described first. In an embodiment, the first switch 310 may include a multi-input port or a multi-output port. For example, the multi-input port may be used for receiving an input of a radio frequency signal output from the RFIC. For example, the multi-input port may include a first input port 381 for receiving an input of the first radio frequency signal from the RFIC or a second input port 382 for receiving an input of the third radio frequency signal from the RFIC. The multi-output port may be connected to an input port configured to input the input radio frequency signal to an amplifier included in the first RFFE. The multi-output port may include a first output port 383 connected to the filter 330 and a second output port 384 which is not connected to the filter 330.

According to various embodiments, the first switch 310 may select an output port connected to an input port under the control of a communication processor (e.g., a control circuit). For example, when the first radio frequency signal is output from the RFIC, the first switch 310 may connect the first input port 381 to the first output port 383 or the second output port 384. As another example, when the third radio frequency signal is output from the RFIC, the first switch 310 may connect the second input port 382 to the first output port 383 or the second output port 384. As still another example, when any one radio frequency signal is output from the RFIC, the first switch 310 may connect the first input port 381 or the second input port 382 to the second output port 384 configured to not pass through the filter 330. As another example, when at least two radio frequency signals are output from the RFIC, the first switch 310 may connect the first input port 381 or the second input port 382 to the first output port 383 configured to pass through the filter 330.

If the isolation of the first switch 310 is small, it may be difficult to secure a designated isolation between the multi-input ports for input to the first switch 310. For example, when the first radio frequency signal and the fourth radio frequency signal are simultaneously transmitted, the fourth radio frequency signal (or a part of the fourth radio frequency signal) may be induced on a third communication path connected to the first RFFE and input to the first RFFE. Since the first RFFE is provided with the fourth radio frequency signal induced on the third communication path together with the first radio frequency signal, an inter-modulation distortion (IMD) signal may be generated in the amplifier included in the first RFFE, and thus the IMD signal may affect a reception signal received through the antenna (e.g., the second antenna module 244 of FIG. 2) of the electronic device 101. When the IMD signal is a signal that is adjacent to or overlaps with the frequency of the reception signal, reception performance may be affected (e.g., deteriorated).

According to an embodiment of the disclosure, the filter 330 may remove (or block, or reduce) the fourth radio frequency signal induced on the third communication path. When the first radio frequency signal and the fourth radio frequency signal are simultaneously transmitted, the communication processor may perform control such that the first input port 381 of the first switch 310 is connected to the first output port 383. When the first input port 381 is connected to the first output port 383, the filter 330 may be configured to pass the first radio frequency signal and remove the induced fourth radio frequency signal, thereby preventing/reducing the IMD signal from being generated by the amplifier included in the first RFFE, two different radio frequency signals can be transmitted without deterioration of reception performance.

According to various embodiments, when the filter 330 is a notch filter, the first switch 310 may include a multi-input port or one output port. For example, the multi-input port may include a first input port 381 for reception of the first radio frequency signal from the RFIC or a second input port 382 for reception of the third radio frequency signal from the RFIC. For example, the multi-input port may be the same regardless of the type of filter 330. The one output port may be connected to an input path for input to an amplifier included in the first RFFE. A second switch 350 may be included on the input path, which is connected to the output port of the first switch 310 and used for input to the amplifier.

The communication processor may be configured to control the second switch 350 based on whether transmission of the radio frequency signal corresponds to a configured condition. The communication processor may be configured to turn on the second switch 350 when the first radio frequency signal and the fourth radio frequency signal are simultaneously transmitted. When the second switch 350 is turned on, the radio frequency signal output from the RFIC may pass through the filter 330 and be input to the amplifier included in the first RFFE. When the first radio frequency signal and the fourth radio frequency signal are simultaneously transmitted, the fourth radio frequency signal may be induced on a third communication path connected to the first RFFE and introduced into the first RFFE. The filter 330 may remove the induced fourth radio frequency signal.

FIG. 3B is a diagram illustrating an example of a circuit according to various embodiments.

Referring to FIG. 3B, a filter 330 of a circuit 300 may be a band-pass filter or a low-pass filter. When the filter 330 is implemented as a band-pass filter or a low-pass filter, the first switch 310 may include, for example, a multi-input port or a multi-output port. The multi-input port may receive an input of a radio frequency signal output from the RFIC. The multi-input port may include a first input port 381 for reception of the first radio frequency signal from the RFIC or a second input port 382 for reception of the third radio frequency signal from the RFIC. The multi-output port may be connected to an input port configured to input the input radio frequency signal to an amplifier included in the first RFFE. The multi-output port may include a first output port 383 connected to the filter 330 and a second output port 384 which is not connected to the filter 330.

For example, the first radio frequency signal output from the RFIC may be input to the first input port 381 of the first switch 310 through the first communication path 301. The third radio frequency signal output from the RFIC may be input to the second input port 382 of the first switch 310 through the third communication path 303.

According to an embodiment, the communication processor may be configured to control the output path of a signal, which is output from the first switch 310, based on whether transmission of the radio frequency signal corresponds to a configured condition. For example, when the first radio frequency signal and the fourth radio frequency signal are transmitted at the same time, the communication processor may be configured to configure the first switch 310 so that the output path of the signal, which is output from the first switch 310, is configured as a first output path 305. Through the first output path 305, the signal output from the first switch 310 may be allowed to pass through the filter 330. When transmitting the first radio frequency signal, the communication processor may be configured to configure the first switch 310 so that the output path of the signal, which is output from the first switch 310, is configured as a second output path 307. Through the second output path 307, the signal output from the first switch 310 may be input to the amplifier included in the first RFFE without passing through the filter 330.

The band pass filter may be configured to pass a signal (or component) corresponding to a designated frequency band. When the filter 330 is implemented as a band-pass filter, the filter 330 may be configured to pass the first radio frequency signal and remove the fourth radio frequency signal introduced into the first RFFE. The first radio frequency signal having passed through the filter 330 may be input to an amplifier included in the first RFFE. According to an embodiment, when the filter 330 is implemented as a band-pass filter, a designated frequency band through which the signal can pass may be varied. For example, the designated frequency band may be configured as a first band when passing through a first radio frequency signal included in a first band, and may be configured as a second band different from the first band when passing through a second radio frequency signal included in a second band.

FIG. 3C is a diagram illustrating another example of a circuit according to various embodiments.

Referring to FIG. 3C, a filter 330 of a circuit 300 may be a notch filter. The notch filter may be a filter configured to remove a signal corresponding to a specific frequency band. The notch filter may have a characteristic opposite to that of the band-pass filter configured to pass only a signal of a specific frequency band. In an embodiment, a first switch 310 may include a multi-input port or a first output port 383. The multi-input port may include a first input port 381 for reception of the first radio frequency signal from the RFIC or a second input port 382 for reception of the third radio frequency signal from the RFIC. The multi-input port may be identical regardless of the type of filter 330. The first output port 383 may be connected to an input path for input to an amplifier included in the first RFFE. The second switch 350 may be included on the path, which is connected to the first output port 383 of the first switch 310 and used for input to the amplifier. In an embodiment, the second switch 350 may be omitted.

For example, the first radio frequency signal may be input to the first input port 381 of the first switch 310 through the first communication path 301, and the third radio frequency signal may be input to the second input port 382 of the first switch 310 through the third communication path 303. The first radio frequency signal or the third radio frequency signal may be input to an amplifier included in the second RFFE through an output path 309.

According to an embodiment, the communication processor may be configured to control the second switch 350 based on whether transmission of the radio frequency signal corresponds to a configured condition. For example, when the first radio frequency signal and the fourth radio frequency signal are transmitted at the same time, the communication processor may be configured to turn on the second switch 350 to remove a part of the signal output from the first switch 310 through the filter 330. For example, the filter 330 may remove the fourth radio frequency signal. When a notch filter is used, a frequency band that needs to be removed may be configured in the notch filter. The fourth radio frequency signal may be removed through the filter 330, and the first radio frequency signal may be input to an amplifier included in the first RFFE. When transmitting the first radio frequency signal, the communication processor may be configured to turn off the second switch 350 so as to input as it is the first radio frequency signal, which is output from the first switch 310, to the amplifier included in the first RFFE. According to an embodiment, when the filter 330 is implemented as a notch filter, a designated frequency band that can be removed may be varied. For example, the designated frequency band may be configured as a first band when removing a first radio frequency signal included in the first band, and may be configured as a second band when removing a second radio frequency signal included in the second band different from the first band.

Figure 4:
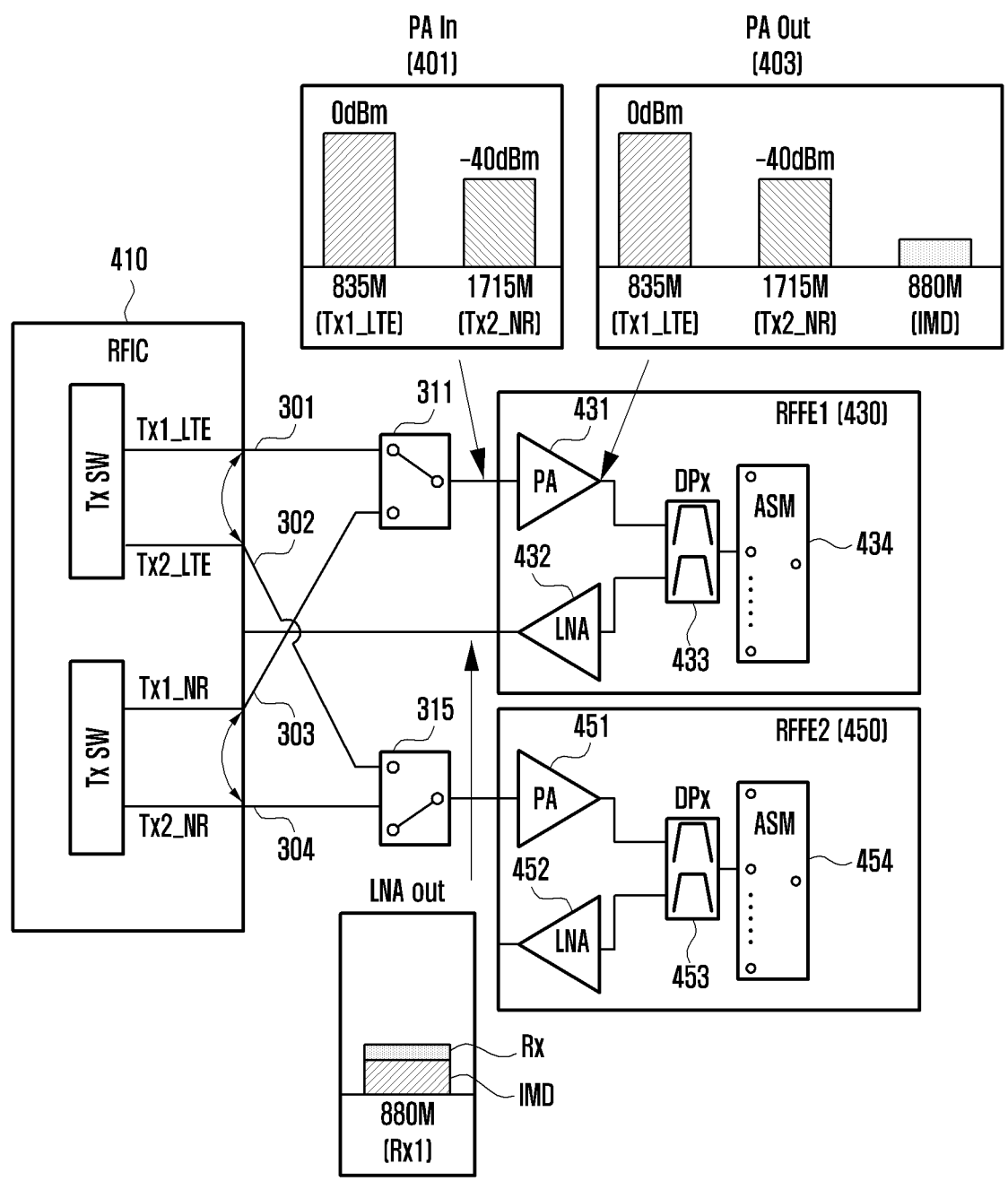
FIG. 4 is a diagram illustrating an example in which reception performance is deteriorated in an electronic device according to a comparative example.

FIG. 4 is a diagram illustrating an example in which sensitivity degradation occurs in an electronic device according to a comparative example.

Referring to FIG. 4, in an electronic device according to a comparative example (e.g., the electronic device 101 of FIG. 1), a first radio frequency signal (e.g., Tx1_LTE) output from an RFIC 410 may be input to a (1-1)th switch 311 through a first communication path 301, a second radio frequency signal (e.g., Tx2_LTE) output from the RFIC 410 may be input to a (1-2)th switch 315 through a second communication path 302, a third radio frequency signal (e.g., Tx1_NR) output from the RFIC 410 may be input to the (1-1)th switch 311 through a third communication path 303, and a fourth radio frequency signal (e.g., Tx2_NR) output from the RFIC 410 may be input to the (1-2)th switch 315 through a fourth communication path 304.

The first radio frequency signal (Tx1_LTE) and the third radio frequency signal (Tx1_NR) may be input to a first power amplifier (PA) 431 of an RFFE 1 430 through the (1-1)th switch 311. The RFFE 1 430 may include, for example, a first amplifier 431, a first low noise amplifier (LNA) 432, a first duplexer 433, or a first antenna switch (ASW) 434. The first amplifier 431 may amplify a radio frequency signal (e.g., a transmission signal) transferred from the RFIC 410. The first low noise amplifier 432 may amplify a radio frequency signal (e.g., a reception signal) received through the antenna and output the received RF signal to the RFIC 410 (e.g., LNA OUT).

The first duplexer 433 may separate frequencies of a transmission signal transmitted through an antenna of the electronic device 101 and a reception signal received through the antenna. The first antenna switch 434 may control the switch according to the frequency band of the transmission signal or the reception signal. Since RFFE 2 450 is the same as or similar to the RFFE 1 430, a detailed description thereof may not be repeated. The RFFE 2 450 may include, for example, a second amplifier 451, a second low noise amplifier 452, a second duplexer 453, or a second antenna switch 454. The second radio frequency signal (Tx2_LTE) and the fourth radio frequency signal (Tx2_NR) may be input to the second amplifier 451 of the RFFE 2 450 through the (1-2)th switch 315.

The first radio frequency signal (Tx1_LTE) or the third radio frequency signal (Tx1_NR) may be an input signal (e.g., PA In 401) of the first amplifier 431. The first amplifier 431 may amplify the first radio frequency signal (Tx1_LTE) or the third radio frequency signal (Tx1_NR). When the first radio frequency signal (Tx1_LTE) and the fourth radio frequency signal (Tx2_NR) are simultaneously transmitted, the fourth radio frequency signal (Tx2_NR) is induced on the third communication path 303 and introduced to the RFFE 1 430. When the second radio frequency signal (Tx2_LTE) and the third radio frequency signal (Tx1_NR) are simultaneously transmitted, the second radio frequency signal (Tx2_LTE) is induced on the first communication path 301 and introduced to the RFFE 1 430.

The first amplifier 431 may generate an intermodulation distortion (IMD) signal (or component) during signal amplification. Intermodulation may refer to a phenomenon in which new frequency components are generated by the combination of the sum or difference of harmonic frequencies of two different signals (e.g., a first radio frequency signal and a fourth radio frequency signal, or a second radio frequency signal and a third radio frequency signal) during an RF signal processing procedure through a nonlinear element.

Intermodulation distortion (IMD) is a phenomenon that occurs when two or more frequency signals are processed simultaneously, and may be referred to as an intermodulation distortion (IMD) signal, as a distortion factor that interferes with a designated signal (e.g., the first radio frequency signal (Tx1_LTE) or the third radio frequency signal (Tx1_NR)). The output signal of the first amplifier 431 (e.g., PA Out 403) may include the amplified first radio frequency signal (e.g., Tx1_LTE), the amplified fourth radio frequency signal (e.g., Tx2_NR), and/or the intermodulation distortion (IMD) signal.

The output signal of the first amplifier 431 (e.g., PA Out 403) may be input to the first duplexer 433, but a part of signal (e.g., an intermodulation distortion signal (IMD)) may be input to the first low-noise amplifier 432. The intermodulation distortion signal IMD input to the first low noise amplifier 432 may overlap with a reception signal (e.g., Rx signal) received through the antenna of the electronic device 101. For example, all or part of the frequency band of the intermodulation distortion signal (IMD) and the frequency band of the received signal may overlap. For example, an output signal (e.g., LNA Out) of the first low noise amplifier 432 may be a signal obtained by amplifying the intermodulation distortion signal together with the reception signal. The intermodulation distortion signal (IMD) may affect the reception signal, thereby affecting the performance of the RFFE 1 430. The intermodulation distortion signal IMD may act as a cause of weakening the performance of the electronic device 101.

An example shown in FIG. 4 may explain the degradation of performance of the reception signal due to the IMD signal generated when the frequency band of the first radio frequency signal (Tx1_LTE) is 824 to 894 MHz, the band of the first reception signal (Rx1) input to the RFFE 1 430 is 869 to 894 MHz, the frequency band of the fourth radio frequency signal (e.g., Tx2_NR) is 1710 to 1785 MHz, and the band of the second reception signal (Rx2) input to the RFFE 2 450 is 1805 to 1880 MHz. The above examples are only provided to help the understanding of the disclosure, and the disclosure is not limited by the examples. When two transmission signals including the first radio frequency signal (Tx1_LTE) (e.g., 835 MHz) and the induced fourth radio frequency signal (e.g., Tx2_NR) (e.g., 1715 MHz) pass through the first amplifier 431 included in the RFFE 1 430, various intermodulation signals may be generated according to the nonlinear characteristics of the first amplifier 431.

In this case, a 2nd order intermodulation (IM2) signal (e.g., 880 MHz (1715-835)) among the generated signals may overlap a frequency band of the first reception signal (Rx1) input to the RFFE 1 430. When the fourth radio frequency signal (e.g., Tx2_NR) is induced on the third communication path 303 of the RFFE 1 430, it cannot be removed through the first duplexer 433, and thus reception performance may deteriorate. In order to address this problem, a designated isolation between the internal ports or output ports of the RFIC 410 (or the input ports of the RFFE 1 430) needs to be secured. However, the designated isolation of internal ports of the RFIC 410 can be difficult to be improved when considering the size of the RFIC 410. For example, in order to secure the designated isolation of the external ports of the RFIC 410, isolation of a configured dB or more (e.g., 50 dB or more) may need to be secured. Isolation between ports may be determined by a distance between ports, and implementing high isolation may lead to insertion loss (IL) degradation and thus the performance of the RFFE 1 430 may be deteriorated.

In various embodiments of the disclosure, a method for configuring a filter on a path through which the signal output from the RFIC 410 is input to the amplifier 431 of the RFFE 1 430 to secure a designated isolation between ports is disclosed.

Figure 5A:
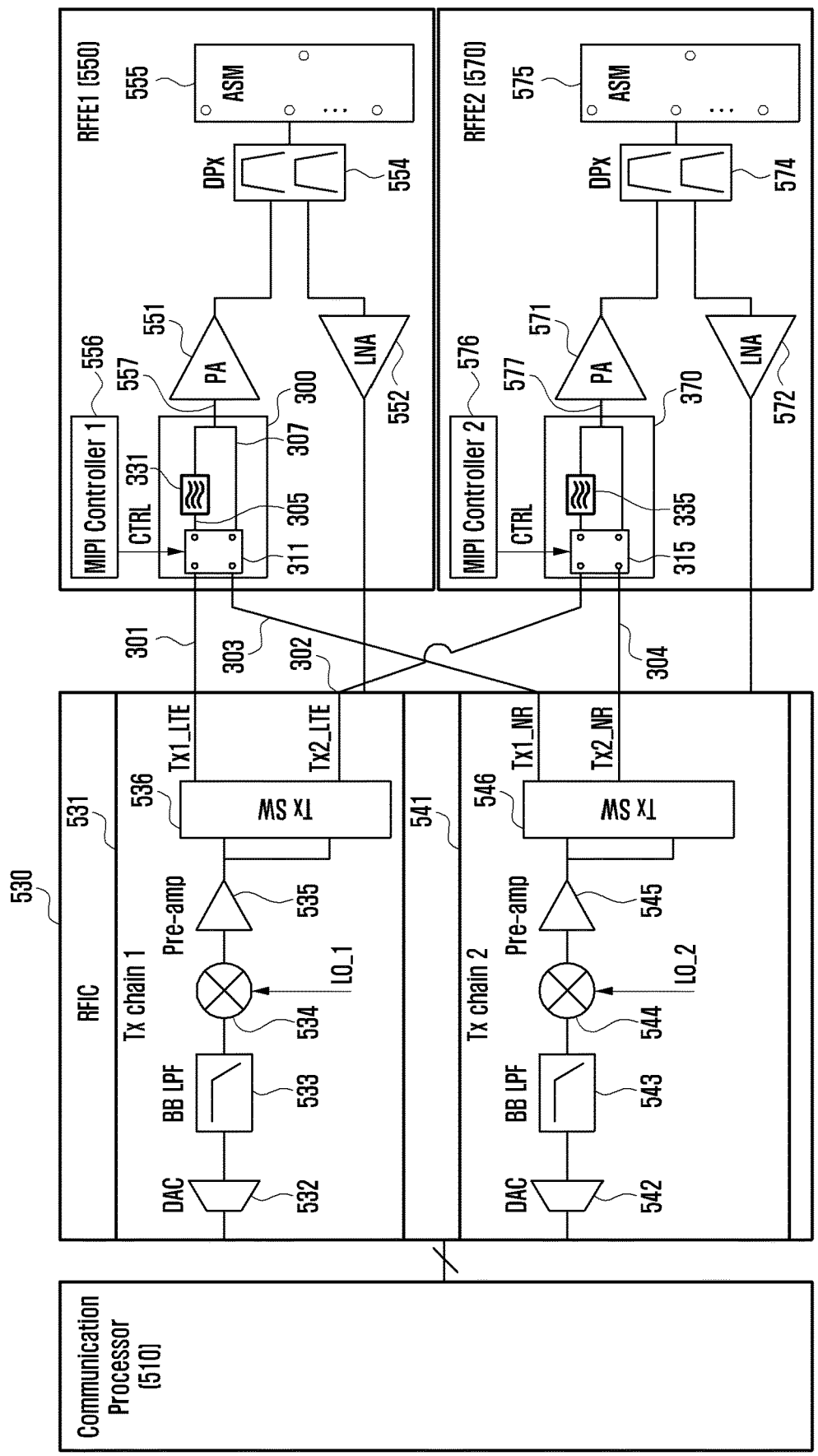
FIGS. 5A and 5B are diagrams illustrating example configurations of an electronic device including a circuit according to various embodiments.
Figure 5B:
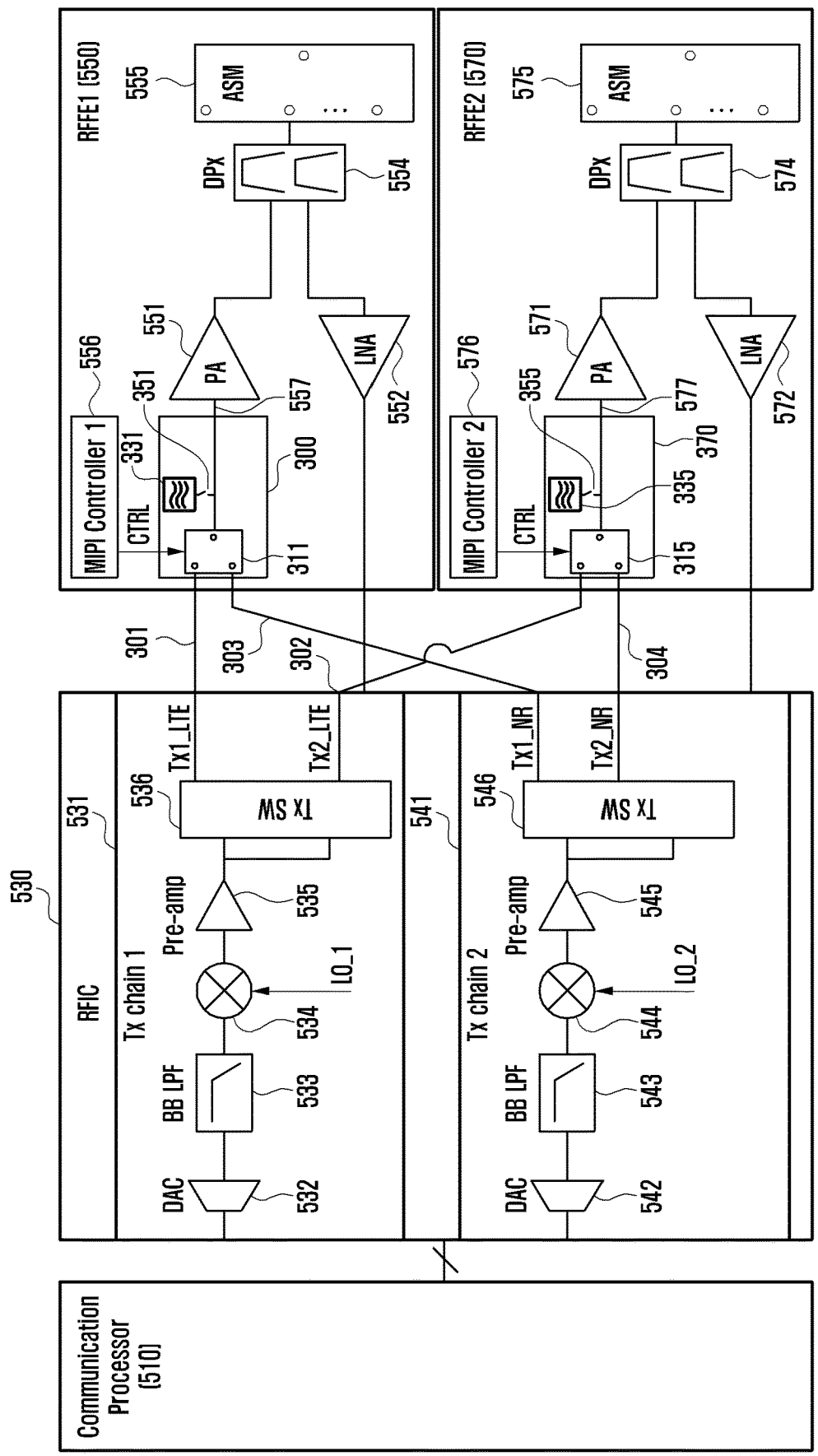

FIGS. 5A and 5B are diagrams illustrating example configurations of an electronic device including a circuit according to various embodiments.

FIG. 5A is a diagram illustrating an example configuration of an electronic device including a circuit including a band-pass filter according to various embodiments.

Referring to FIG. 5A, an electronic device (e.g., the electronic device 101 of FIG. 1) according to various embodiments may include a communication processor 510 (e.g., the first communication processor 212), an RFIC 530 (e.g., the first RFIC 222 and the second RFIC 224 of FIG. 2 are implemented as one), an RFFE 1 550 (e.g., the first RFFE 232 of FIG. 2), and/or an RFFE 2 570 (e.g., the second RFFE 234 of FIG. 2). In an embodiment, the RFFE 1 550 or RFFE 2 570 may be configured as one integrated circuit or chip (e.g., a single chip, or a single package).

The communication processor 510 may support establishment of a communication channel of a band to be used for wireless communication with a network (e.g., the network 199 of FIG. 1), and network communication through the established communication channel. According to various embodiments, the network may include a second generation (2G), 3G, 4G, long term evolution (LTE), or 5G network. The communication processor 510 may generate a signal (e.g., a transmission signal) to be transmitted through an antenna (e.g., the antenna module 197 of FIG. 1) of the electronic device 101 and transmit the generated signal to the RFIC 530.

The RFIC 530 may convert (e.g., up-convert) a baseband signal generated by the communication processor 510 into a radio frequency signal during transmission. In an embodiment, the RFIC 530 may include at least two local oscillators to support E-UTRA/NR dual connectivity (ENDC). For example, the RFIC 530 may include a first transmission chain (Tx chain 1) 531 and a second transmission chain (Tx chain 2) 541. The first transmission chain 531 may include, for example, a digital to analog converter (DAC) 532, a baseband low pass filter (BB LPF) 533, a mixer 534, a local oscillator (LO1), an amplifier (preamp) 535, and/or a transmission switch circuit (Tx SW) 536. The second transmission chain 541 may include, for example, a DAC 542, a BB BPF 543, a mixer 544, a local oscillator (LO2), an amplifier 545, and/or a transmission switch circuit 546.

For example, the RFIC 530 may output at least two radio frequency signals (e.g., Tx1_LTE and Tx2_LTE) used in a first network (e.g., the first network 292 of FIG. 2) through the first transmission chain 531. As another example, the RFIC 530 may output at least two radio frequency signals (e.g., Tx1_NR and Tx2_NR) used in a second network (e.g., the second network 294 of FIG. 2) through the second transmission chain 541. The RFIC 530 may output a first radio frequency signal (e.g., Tx1_LTE) through the first transmission chain 531 or output a fourth radio frequency signal (e.g., Tx2_NR) through the second transmission chain 541. For example, the first radio frequency signal or the fourth radio frequency signal may have different frequency bands.

According to an embodiment, the first radio frequency signal (Tx1_LTE) may be transferred to the RFFE 1 550 through the first communication path 301, the second radio frequency signal (Tx2_LTE) may be transferred to the RFFE 2 570 through the second communication path 302, a third radio frequency signal (Tx1_NR) may be transferred to the RFFE 1 550 through the third communication path 303, and a fourth radio frequency signal (Tx2_NR) may be transferred to the RFFE 2 570 through the fourth communication path 304.

In an embodiment, adding the "first" and "second" to the same term (e.g., circuit, switch, filter, amplifier, low-noise amplifier, etc.) for differentiation is merely to provide identification numbers to help understanding of the disclosure, the disclosure is not limited thereto. The RFFE 1 550 may include a first circuit 300, a first amplifier (PA) 551, a first low-noise amplifier (LNA) 552, a first duplexer (DPx) 554, a first antenna switch (ASM) 555, and/or MIPI controller 1 556.

In an embodiment, the first circuit 300 (e.g., the circuit 300 of FIG. 3B) may remove some signals generating noise (or interference) at a designated signal among radio frequency signals output from the RFIC 530. The first amplifier 551 may amplify the first radio frequency signal (Tx1_LTE) or the third radio frequency signal (Tx1_NR) output from the first circuit 300. The first low noise amplifier 552 may amplify a reception signal received through an antenna (e.g., the antenna module 197 of FIG. 1) of the electronic device 101. The first duplexer 554 may include, for example, a plurality of filters or duplexers for each frequency band. The first antenna switch 555 may connect the first duplexer 554 to the antenna module 197 by controlling the switch according to a frequency band of a signal to be transmitted/received. The MIPI controller 1 556 may control the first switch 310 included in the first circuit 300 under the control of the communication processor 510.

In an embodiment, the first circuit 300 may include a (1-1)th switch 311 and/or a first filter 331. In FIG. 5A, the first filter 331 may include, for example, a band-pass filter or a low-pass filter. The (1-1)th switch 311 may selectively connect the first communication path 301 and the third communication path 303 to an input port of the first amplifier 551 included in the RFFE 1 550. The first communication path 301 and the third communication path 303 may be connected to, for example, an input port of the (1-1)th switch 311. When the first radio frequency signal (Tx1_LTE) is transferred from the RFIC 530, the (1-1)th switch 311 may connect the first communication path 301 to the input port 557 of the first amplifier 551 included in the RFFE 1 550. When the third radio frequency signal (Tx1_NR) is transferred from the RFIC 530, the (1-1)th switch 311 may connect the third communication path 303 to the input port 557 of the first amplifier 551 included in the RFFE 1 550. In an embodiment, the first circuit 300 may control the path of a signal input to the first amplifier 551 by controlling the (1-1)th switch 311 under the control of the communication processor 510.

In an embodiment, the RFFE 2 570 may include a second circuit 370, a second amplifier 571, a second low noise amplifier 572, a second duplexer 574, a second antenna switch 575, and/or MIPI controller 2 576. In an embodiment, the second circuit 370 may include a (1-2)th switch 315 and/or a second filter 335. In FIG. 5A, the second filter 335 may include, for example, a band-pass filter or a low-pass filter. The (1-2)th switch 315 may selectively connect the second communication path 302 and the fourth communication path 304 to an input port of the second amplifier 571 included in the RFFE 2 570. The second communication path 302 and the fourth communication path 304 may be connected to an input port of the (1-2)th switch 315, for example.

When the second radio frequency signal (Tx2_LTE) is transferred from the RFIC 530, the (1-2)th switch 315 may connect the second communication path 302 to the input port 577 of the second amplifier 571 included in the RFFE 2 550. When the fourth radio frequency signal (Tx2_NR) is transferred from the RFIC 530, the (1-2)th switch 315 may connect the fourth communication path 304 to the input port 577 of the second amplifier 571 included in the RFFE 2 570. In an embodiment, the second circuit 370 may control a path of a signal input to the second amplifier 571 by controlling the (1-2)th switch 315 under the control of the communication processor 510.

According to an embodiment, the communication processor 510 may be configured to configure an output path of a signal, which is output from the (1-1)th switch 311 or (1-2)th switch 315, based on whether transmission of the radio frequency signal corresponds to a configured condition. When the first radio frequency signal (Tx1_LTE) and the fourth radio frequency signal (Tx2_NR) ae simultaneously transmitted (e.g., corresponding to a configured condition), the communication processor 510 may be configured to configure the output path of the signal output from the (1-1)th switch 311 as the first output path 305. When the first radio frequency signal (Tx1_LTE) and the fourth radio frequency signal (Tx2_NR) are simultaneously transmitted, the fourth radio frequency signal (Tx2_NR) may be induced on the third communication path 303 and input to the (1-1)th switch 311. In this case, the first radio frequency signal (Tx1_LTE) and the induced fourth radio frequency signal (Tx2_NR) may be input to the (1-1)th switch 311.

Since the first radio frequency signal (Tx1_LTE) needs to be amplified and transmitted through the RFFE 1 550, the induced fourth radio frequency signal (Tx2_NR) may act as an unnecessary signal, for example, noise. The first output path 305 may cause the signal output from the (1-1)th switch 311 to pass through the first filter 331. The communication processor 510 may be configured to remove the induced fourth radio frequency signal (Tx2_NR) through the filter 330 among the first radio frequency signal (Tx1_LTE) and the induced fourth radio frequency signal (Tx2_NR) input to the (1-1)th switch 311.

According to an embodiment, when the first radio frequency signal (Tx1_LTE) and the fourth radio frequency signal (Tx2_NR) are simultaneously transmitted (e.g., corresponding to a preconfigured condition), the communication processor 510 may be configured to configure the output path of a signal, which is output from the (1-2)th switch 315, as a path through which the signal passes through the second filter 335. When the first radio frequency signal (Tx1_LTE) and the fourth radio frequency signal (Tx2_NR) are simultaneously transmitted, the first radio frequency signal (Tx1_LTE) may be induced on the second communication path 302 and input to the (1-2)th switch 315. In this case, the induced first radio frequency signal (Tx1_LTE) and the fourth radio frequency signal (Tx2_NR) may be input to the (1-2)th switch 315. Since the fourth radio frequency signal (Tx2_NR) needs to be amplified and transmitted through the RFFE 2 570, the induced first radio frequency signal (Tx1_LTE) may act as an unnecessary signal, for example, noise. The communication processor 510 may be configured to remove the induced first radio frequency signal (Tx1_LTE) through the second filter 335 among the induced first radio frequency signal (Tx1_LTE) and the fourth radio frequency signal (Tx2_NR) input to the (1-2)th switch 315.

According to an embodiment, when the second radio frequency signal (Tx2_LTE) and the third radio frequency signal (Tx1_NR) are simultaneously transmitted (e.g., corresponding to a configured condition), the communication processor 510 may be configured to configure an output path of a signal, which is output from the (1-1)th switch 311, as the first output path 305. When the second radio frequency signal (Tx2_LTE) and the third radio frequency signal (Tx1_NR) are simultaneously transmitted, the second radio frequency signal (Tx2_LTE) may be induced on the first communication path 301 and input to the (1-1)th switch 311. In this case, the induced second radio frequency signal (Tx2_LTE) and the third radio frequency signal (Tx1_NR) may be input to the (1-1)th switch 311.

Since the third radio frequency signal (Tx1_NR) needs to be amplified and transmitted through the RFFE 1 550, the induced second radio frequency signal (Tx2_LTE) may act as an unnecessary signal, for example, noise. The first output path 305 may cause a signal output from the (1-1)th switch 311 to pass through the first filter 331. The communication processor 510 may be configured to remove the induced second radio frequency signal (Tx2_LTE) through the first filter 330 among the third radio frequency signal (Tx1_NR) and the induced second radio frequency signal (Tx2_LTE) input to the (1-1)th switch 311.

According to an embodiment, when the second radio frequency signal (Tx2_LTE) and the third radio frequency signal (Tx1_NR) are simultaneously transmitted (e.g., corresponding to a configured condition), the communication processor 510 may be configured to configure the output path of a signal, which is output from the (1-2)th switch 315, as a path through which the signal passes through the second filter 335. When the second radio frequency signal (Tx2_LTE) and the third radio frequency signal (Tx1_NR) are simultaneously transmitted, the third radio frequency signal (Tx1_NR) may be induced on the fourth communication path 304 and input to the (1-2)th switch 315. In this case, the second radio frequency signal (Tx2_LTE) and the induced third radio frequency signal (Tx1_NR) may be input to the (1-2)th switch 315. Since the second radio frequency signal (Tx2_LTE) needs to be amplified and transmitted through the RFFE 2 570, the induced third radio frequency signal (Tx1_NR) may act as an unnecessary signal, for example, noise. The communication processor 510 may be configured to remove the induced third radio frequency signal (Tx1_NR) through the second filter 335 among the second radio frequency signal (Tx2_LTE) and the induced third radio frequency signal (Tx1_NR) input to the (1-2)th switch 315.

In an embodiment, when transmitting a first radio frequency signal (Tx1_LTE) or a third radio frequency signal (Tx1_NR) among the first radio frequency signal (Tx1_LTE), the second radio frequency signal (Tx2_LTE), the third radio frequency signal (Tx1_NR), or the fourth radio frequency signal (Tx2_NR) (e.g., not correspond to the configured condition), the communication processor 510 may be configured to configure the output path of a signal, which is output from the (1-1)th switch 311, as the second output path 307. The second output path 307 may prevent/reduce the signal output from the (1-1)th switch 311 from passing through the first filter 331. For example, when only the first radio frequency signal (Tx1_LTE) is transmitted, there is no signal induced through the third communication path 303, and thus only the first radio frequency signal (Tx1_LTE) may be input to the (1-1)th switch 311.

Since there is no other signal acting as noise in the first radio frequency signal (Tx1_LTE), the communication processor 510 may be configured to perform control such that the first radio frequency signal (Tx1_LTE), which is input to the (1-1)th switch 311, is input as it is to the first amplifier 551 (e.g., bypassing the first filter 331). As another example, when only the third radio frequency signal (Tx1_NR) is transmitted, only the third radio frequency signal (Tx1_NR) may be input to the (1-1)th switch 311. Since there is no other signal acting as noise in the third radio frequency signal (Tx1_NR), the communication processor 510 may be configured to perform control such that the third radio frequency signal (Tx1_NR), which is input to the (1-1)th switch 311, is input as it is to the first amplifier 551 (e.g., bypassing the first filter 331).

In an embodiment, when transmitting a second radio frequency signal (Tx2_LTE) or a fourth radio frequency signal (Tx2_NR) among the first radio frequency signal (Tx1_LTE), the second radio frequency signal (Tx2_LTE), the third radio frequency signal (Tx1_NR), or the fourth radio frequency signal (Tx2_NR), the communication processor 510 may be configured to configure the output path of a signal, which is output from the (1-2)th switch 315, as a path configured to not pass through the second filter 335. For example, when only the fourth radio frequency signal (Tx2_NR) is transmitted, only the fourth radio frequency signal (Tx2_NR) may be input to the (1-2)th switch 315.

Since there is no other signal acting as noise in the fourth radio frequency signal (Tx2_NR), the communication processor 510 may be configured to perform control such that the fourth radio frequency signal (Tx2_NR), which is input to the (1-2)th switch 315, is input as it is to the second amplifier 571 (e.g., bypassing the second filter 335). As another example, when only the second radio frequency signal (Tx2_LTE) is transmitted, there is no signal induced through the fourth communication path 304, and thus only the second radio frequency signal (Tx2_LTE) may be input to the (1-2)th switch 315. Since there is no other signal acting as noise in the second radio frequency signal (Tx2_LTE), the communication processor 510 may be configured to perform control such that the second radio frequency signal (Tx2_LTE), which is input to the (1-2)th switch 315, is input as it is to the second amplifier 571 (e.g., bypassing the second filter 335).

In an embodiment, the (1-1)th switch 311 or the (1-2)th switch 315 may include a double-pole-double-throw (DPDT) switch. As another example, the second switch 355 may include a single-pole-single-throw (SPST) switch.

FIG. 5B is a diagram illustrating an example configuration of an electronic device including a circuit including a notch filter according to various embodiments.

Referring to FIG. 5B, the electronic device 101 may include a communication processor 510, an RFIC 530, RFFE 1 550, and/or RFFE 2 570. Since the communication processor 510 and the RFIC 530 have been described in detail with reference to FIG. 5A, the description may not be repeated. In addition, the RFFE 1 550 and the RFFE 2 570 are different in the configuration of a circuit (e.g., the first circuit 300 and the second circuit 370) (the circuit 300 of FIG. 3C), the description of the remaining elements is substantially the same, the description may not be repeated here.

According to various embodiments, the first radio frequency signal (Tx1_LTE) may be transferred to the RFFE 1 550 through the first communication path 301, the second radio frequency signal (Tx2_LTE) may be transferred to the RFFE 2 570 through the second communication path 302, the third radio frequency signal (Tx1_NR) may be transferred to the RFFE 1 550 through the third communication path 303, the fourth radio frequency signal (Tx2_NR) may be transferred to the RFFE 2 570 through the fourth communication path 304.

According to various embodiments, the first circuit 300 included in the RFFE 1 550 may include a (1-1)th switch 311, a first filter 331, and/or a (2-1)th switch 351. When the first filter 331 includes a notch filter, there is one output path for output from the (1-1)th switch 311, and the output path and the (2-1)th switch 351 are connected so as to control the operation of the first filter 331. The (1-1)th switch 311 may selectively connect the first communication path 301 and the third communication path 303 to the input port of the first amplifier 551 included in the RFFE 1 550. The first communication path 301 and the third communication path 303 may be connected to, for example, an input port of the (1-1)th switch 311. When the first radio frequency signal (Tx1_LTE) is transferred from the RFIC 530, the (1-1)th switch 311 may connect the first communication path 301 to the input port 557 of the first amplifier 551 included in the RFFE 1 550. When the third radio frequency signal (Tx1_NR) is transferred from the RFIC 530, the (1-1)th switch 311 may connect the third communication path 303 to the input port 557 of the first amplifier 551 included in the RFFE 1 550. In an embodiment, the first circuit 300 may control the path of a signal input to the first amplifier 551 by controlling the (1-1)th switch 311 under the control of the communication processor 510.

According to various embodiments, the second circuit 370 included in RFFE 2 570 may include a (1-2)th switch 315, a second filter 335 and/or a (2-2)th switch 355. When the second filter 335 included in the RFFE 2 570 includes a notch filter, there is one output path for output from the (1-2)th switch 315, and the output path and the (2-2)th switch 355 may be connected to control the operation of the second filter 335. The (1-2)th switch 315 may selectively connect the second communication path 302 and the fourth communication path 304 to the input port of the second amplifier 571 included in the RFFE 2 570. The second communication path 302 and the fourth communication path 304 may be connected to, for example, the (1-2)th switch 315. When the second radio frequency signal (Tx2_LTE) is transferred from the RFIC 530, the (1-2)th switch 315 may connect the second communication path 302 to the input port 577 of the second amplifier 571 included in the RFFE 2 550. When the fourth radio frequency signal (Tx2_NR) is transferred from the RFIC 530, the (1-2)th switch 315 may connect the fourth communication path 304 to the input port 557 of the second amplifier 571 included in the RFFE 2 570. In an embodiment, the second circuit 370 may control a path of a signal input to the second amplifier 571 by controlling the (1-2)th switch 315 under the control of the communication processor 510.

According to various embodiments, the communication processor 510 may be configured to control the (2-1)th switch 351 or the (2-2)th switch 355 based on whether transmission of the radio frequency signal corresponds to a configured condition. The configured condition may correspond to, for example, a case in which the first radio frequency signal (Tx1_LTE) and the fourth radio frequency signal (Tx2_NR) are simultaneously transmitted or a case in which the second radio frequency signal (Tx2_LTE) and the third radio frequency signal (Tx1_NR) are simultaneously transmitted. For example, when the first radio frequency signal (Tx1_LTE) and the fourth radio frequency signal (Tx2_NR) are transmitted (e.g., corresponding to a configured condition), the communication processor 510 may be configured to turn on the (2-1)th switch 351. When the first radio frequency signal (Tx1_LTE) and the fourth radio frequency signal (Tx2_NR) are simultaneously transmitted, the fourth radio frequency signal (Tx2_NR) may be induced on the third communication path 303 and input to the (1-1)th switch 311.

In this case, the first radio frequency signal (Tx1_LTE) and the induced fourth radio frequency signal (Tx2_NR) may be input to the (1-1)th switch 311. Since the first radio frequency signal (Tx1_LTE) needs to be amplified and transmitted through the RFFE 1 550, the induced fourth radio frequency signal (Tx2_NR) may act as an unnecessary signal, for example, noise. The communication processor 510 may be configured to turn on the (2-1)th switch 351 to remove the induced fourth radio frequency signal (Tx2_NR) through the first filter 331, among the first radio frequency signal (Tx1_LTE) and the induced fourth radio frequency signal (Tx2_NR) input to the (1-1)th switch 311.

According to an embodiment, when the first radio frequency signal (Tx1_LTE) and the fourth radio frequency signal (Tx2_NR) are simultaneously transmitted (e.g., corresponding to a configured condition), the communication processor 510 may be configured to turn on the (2-2)th switch 355. When the first radio frequency signal (Tx1_LTE) and the fourth radio frequency signal (Tx2_NR) are simultaneously transmitted, the first radio frequency signal (Tx1_LTE) may be induced on the second communication path 302 and input to the (1-2)th switch 315. In this case, the induced first radio frequency signal (Tx1_LTE) and the fourth radio frequency signal (Tx2_NR) may be input to the (1-2)th switch 315. Since the fourth radio frequency signal (Tx2_NR) needs to be amplified and transmitted through the RFFE 2 570, the induced first radio frequency signal (Tx1_LTE) may act as an unnecessary signal, for example, noise. The communication processor 510 may be configured to turn on the (2-2)th switch 355 to remove the induced first radio frequency signal (Tx1_LTE) through the second filter 335, among the fourth radio frequency signal (Tx2_NR) and the induced first radio frequency signal (Tx1_LTE) input to the (1-2)th switch 315.

According to an embodiment, when the second radio frequency signal (Tx2_LTE) and the third radio frequency signal (Tx1_NR) are simultaneously transmitted (e.g., corresponding to a configured condition), the communication processor 510 may be configured to turn on the (2-1)th switch 351. When the second radio frequency signal (Tx2_LTE) and the third radio frequency signal (Tx1_NR) are simultaneously transmitted, the second radio frequency signal (Tx2_LTE) may be induced on the first communication path 301 and input to the (1-1)th switch 311. In this case, the induced second radio frequency signal (Tx2_LTE) and the third radio frequency signal (Tx1_NR) may be input to the (1-1)th switch 311. Since the third radio frequency signal (Tx1_NR) needs to be amplified and transmitted through the RFFE 1 550, the induced second radio frequency signal (Tx2_LTE) may act as an unnecessary signal, for example, noise. The communication processor 510 may be configured to turn on the (2-1)th switch 351 to remove the induced second radio frequency signal (Tx2_LTE) through the first filter 331, among the third radio frequency signal (Tx1_NR) and the induced second radio frequency signal (Tx2_LTE) input to the (1-1)th switch 311.

According to an embodiment, when the second radio frequency signal (Tx2_LTE) and the third radio frequency signal (Tx1_NR) are simultaneously transmitted (e.g., corresponding to a configured condition), the communication processor 510 may be configured to turn on the (2-2)th switch 355. When the second radio frequency signal (Tx2_LTE) and the third radio frequency signal (Tx1_NR) are simultaneously transmitted, the third radio frequency signal (Tx1_NR) may be induced on the fourth communication path 304 and input to the (1-2)th switch 315. In this case, the second radio frequency signal (Tx2_LTE) and the induced third radio frequency signal (Tx1_NR) may be input to the (1-2)th switch 315. Since the second radio frequency signal (Tx2_LTE) needs to be amplified and transmitted through the RFFE 2 570, the induced third radio frequency signal (Tx1_NR) may act as an unnecessary signal, for example, noise. The communication processor 510 may be configured to turn on the (2-2)th switch 355 to remove the induced third radio frequency signal (Tx1_NR) through the second filter 335, among the second radio frequency signal (Tx2_LTE) and the induced third radio frequency signal (Tx1_NR) input to the (1-2)th switch 315.

In an embodiment, when one of a first radio frequency signal (Tx1_LTE), a second radio frequency signal (Tx2_LTE), a third radio frequency signal (Tx1_NR), or a fourth radio frequency signal (Tx2_NR) is transmitted (e.g., not correspond to a configured condition), the communication processor 510 may be configured to turn off the (2-1)th switch 351. For example, when only the first radio frequency signal (Tx1_LTE) is transmitted, there is no signal induced through the third communication path 303, and thus only the first radio frequency signal (Tx1_LTE) may be input to the (1-1)th switch 311. Since there is no other signal acting as noise in the first radio frequency signal (Tx1_LTE), the communication processor 510 may be configured to perform control such that the first radio frequency signal (Tx1_LTE), which is input to the (1-1)th switch 311, is input as it is to the first amplifier 551 (e.g., bypassing the first filter 331).

In an embodiment, when one of a first radio frequency signal (Tx1_LTE), a second radio frequency signal (Tx2_LTE), a third radio frequency signal (Tx1_NR), or a fourth radio frequency signal (Tx2_NR) is transmitted, the communication processor 510 may be configured to turn off the (2-2)th switch 355. For example, when only the fourth radio frequency signal (Tx2_NR) is transmitted, only the fourth radio frequency signal (Tx2_NR) may be input to the (1-2)th switch 315. Since there is no other signal acting as noise in the fourth radio frequency signal (Tx2_NR), the communication processor 510 may be configured to perform control such that the fourth radio frequency signal (Tx2_NR), which is input to the (1-2)th switch 315, is input as it is to the second amplifier 571 (e.g., bypassing the second filter 335).

Figure 6A:
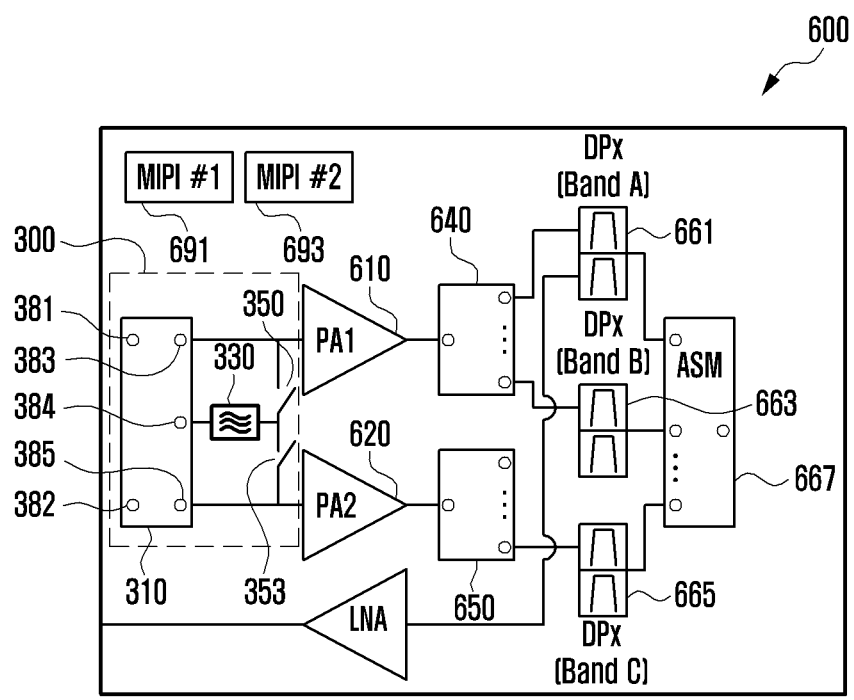
FIGS. 6A and 6B are diagrams illustrating example configurations of an RFFE including a circuit according to various embodiments.
Figure 6B:
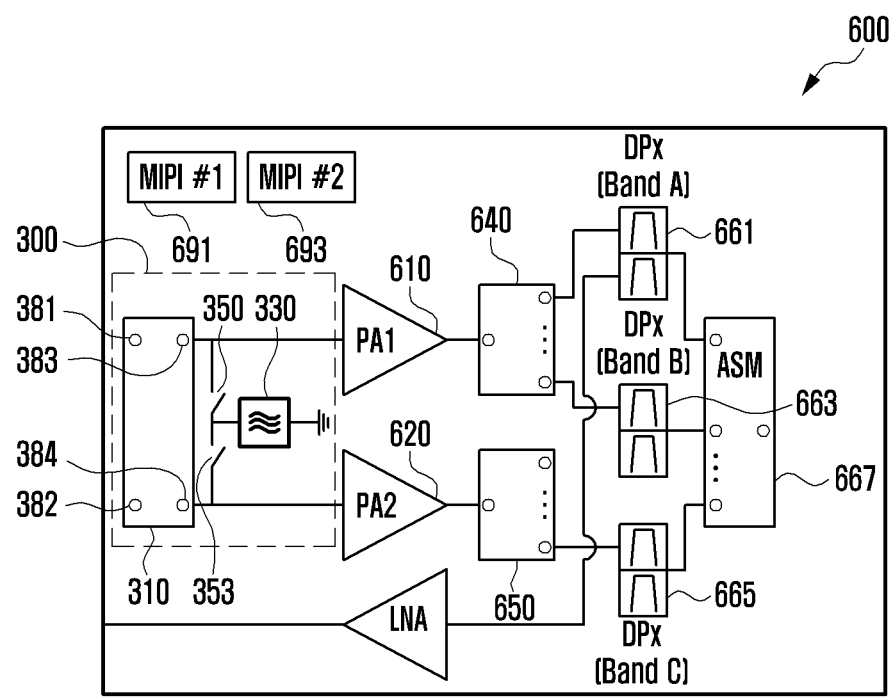

FIGS. 6A and 6B are diagrams illustrating example configurations of an electronic device including a circuit according to various embodiments.

FIG. 6A is a diagram illustrating an example configuration of an RFFE including a circuit including a band pass filter according to various embodiments.

Referring to FIG. 6A, an RFFE 600 may be configured to cover a band of a wide frequency region. For example, the RFFE 600 may support a low band (LB) (e.g., 600 MHz to 1 GHz), a mid-band (MB) (e.g., 1.5 GHz to 2.2 GHz), or a high band (HB) (e.g., 2.3 GHz to 2.7 GHz). As another example, the RFFE 600 may cover a mid-band or a high-band. The RFFE 600 covers a low band, a mid-band, or a high band, but may be implemented to include a plurality of amplifiers to amplify each frequency band in order to optimize Tx performance in each frequency band.

In an embodiment, the RFFE 600 may include a circuit 300 (e.g., the circuit 300 of FIG. 3B), a first amplifier 610 (e.g., the first amplifier 551 or second amplifier 571 of FIG. 5A or 5B), a second amplifier 620 (e.g., the first amplifier 551 or second amplifier 571 of FIG. 5A or 5B), a first band switch BSW1 640, a second band switch BSW2 650, a first duplexer 661 (e.g., the first duplexer 554 or second duplexer 574 of FIG. 5A or 5B), a second duplexer 663 (e.g., the first duplexer 554 or second duplexer 574 of FIG. 5A or 5B), a third duplexer 665 (e.g., the first duplexer 554 or second duplexer 574 of FIG. 5A or 5B), an antenna switch 667 (e.g., the first antenna switch 555 or second antenna switch 575 of FIG. 5A or 5B), and/or an MIPI controller (e.g., MIPI #1 691, MIPI #2 693) (e.g., the first MIPI controller 1 556 or second MIPI controller 1 576 of FIG. 5A or 5B).

The first band switch 640 may connect the first amplifier 610 to one of the first duplexer 661 to the third duplexer 665 according to the frequency band of the signal output from the first amplifier 610. Alternatively, the second band switch 650 may connect the second amplifier 620 to one of the first duplexer 661 to the third duplexer 665 according to the frequency band of the signal output from the second amplifier 620. Since the description of the elements included in the RFFE 600 has been described in detail with reference to FIG. 5A, the detailed description may not be repeated. For example, the RFFE 600 may be disposed at the location of the RFFE 1 550 or RFFE 2 570 in FIG. 5A.

According to various embodiments, the low band may be divided into a first frequency band (e.g., 600 MHz to 800 MHz) and a second frequency band (e.g., 800 MHz to 1 GHz). The first amplifier 610 may amplify the radio frequency signal of the first frequency band of low band, and the second amplifier 620 may amplify the radio frequency signal of the second frequency band of low band. As another example, the first amplifier 610 may amplify the radio frequency signal of mid-band, and the second amplifier 620 may amplify the radio frequency signal of high-band. For example, the division of the frequency band, which amplified by the first amplifier 610 or the second amplifier 620, may be designed according to the performance of the amplifier included in the RFFE 600. When the RFFE 600 includes a plurality of amplifiers, since the signal transferred from the RFIC (e.g., the RFIC 530 of FIG. 6A) needs to be transferred to each amplifier (e.g., the first amplifier 610 or the second amplifier 620), a switch may be used for the input port of the RFFE 600. According to an embodiment of the disclosure, the first switch 310 included in the circuit 300 may be used for an input path through which the signal, which is output from the RFIC 530, is input to the first amplifier 610 or the second amplifier 620.

According to various embodiments, the circuit 300 may include a first switch 310, a filter 330, a second switch 350, and/or a third switch 353.

According to an embodiment, the first switch 310 may perform control to transfer the first radio frequency signal, which is output from the RFIC 530, to the first amplifier 610 and transfer the second radio frequency signal, which is output from the RFIC 530, to the second amplifier 620. The filter 330 may include, for example, a band-pass filter. In an embodiment, when the filter 330 is implemented as a band-pass filter, the filter 330 may be connected to an output port of the first switch 310. Even when the second switch 350 and/or the third switch 353 are both turned off, the filter 330 may be connected to the output port of the first switch 310. The second switch 350 or the third switch 353 may be controlled under the control of the communication processor (e.g., the communication processor 510 of FIGS. 5A and 5B) (e.g., MIPI #1 691, MIPI #2 693). For example, the second switch 350 may be turned on or off according to the control of the MIPI #1 691. The third switch 353 may be turned on or off according to the control of the MIPI #2 693.

According to various embodiments, the first switch 310 may include a multi-input port or a multi-output port. For example, the multi-input port may be used for receiving a radio frequency signal output from the RFIC 530. The multi-input port may include a first input port 381 for reception of a first radio frequency signal (e.g., Tx1_LTE) from the RFIC 530 or a second input port 382 for reception of a third radio frequency signal (e.g., Tx1_NR) from the RFIC 530. For example, the multi-output port may include a first output port 383 for input to the first amplifier 610 without passing through the filter 330, a second output port 384 configured to pass through the filter 330, and a third output port 385 for input to the second amplifier 620 without passing through the filter 330.

According to various embodiments, the first switch 310 may selectively connect an input port and an output port under the control of a communication processor (e.g., a control circuit). The communication processor 510 may be configured to perform control such that the radio frequency signal is input to the first amplifier 610 or the second amplifier 620 by controlling the first switch 310 according to the frequency band of the radio frequency signal. For example, when the first radio frequency signal (Tx1_LTE) is output from the RFIC 530, the first switch 310 may connect the first input port 381 to one of the first output port 383 to the third output port 385. The first switch 310 may connect the second input port 382 to one of the first output port 383 to the third output port 385 when the third radio frequency signal (Tx1_NR) is output from the RFIC 530.

When one radio frequency signal is output from the RFIC 530, the first switch 310 may connect the first input port 381 or the second input port 382 to the first output port 383 or the third output port 385 configured to not pass through the filter 330. As another example, when at least two radio frequency signals are output from the RFIC 530, the first switch 310 may connect the first input port 381 or the second input port 382 to the second output port 384 configured to pass through the filter 330.

According to various embodiments, the communication processor 510 may be configured to control at least one of the second switch 350, the third switch 353, and the output path of the signal output from the first switch 310 based on whether transmission of the radio frequency signal corresponds to a configured condition. The configured condition may correspond to, for example, a case in which the first radio frequency signal (Tx1_LTE) and the fourth radio frequency signal (Tx2_NR) are simultaneously transmitted or a case in which the second radio frequency signal (Tx2_LTE) and the third radio frequency signal (Tx1_NR) are simultaneously transmitted.

The communication processor 510 may be configured to configure, as the second output port 384, the output path of the signal output from the first switch 310, when the transmission of the radio frequency signal corresponds to a configured condition, and may turn on the second switch 350 or the third switch 353. When the transmission of the radio frequency signal does not correspond to the configured condition, the communication processor 510 may be configured to configure the first output port 383 or the third output port 385 as the output path of the signal output from the first switch 310, based on the frequency band of the radio frequency signal when the transmission of the radio frequency signal does not correspond to a configured condition, and may turn off the second switch 350 and the third switch 353.

For example, when the output path of the signal output from the first switch 310 is configured as the second output port 384 and the second switch 350 is turned on, the induced fourth radio frequency signal (e.g., Tx2_NR) and the first radio frequency signal (e.g., Tx1_LTE) output from the RFIC 530 may pass through the filter 330 and be input to the first amplifier 610. The induced fourth radio frequency signal (e.g., Tx2_NR) may be removed through the filter 330, and the first radio frequency signal (e.g., Tx1_LTE) may be input to the first amplifier 610. When the output path of the signal output from the first switch 310 is configured as the first output port 383 and the second switch 350 is turned off, the first radio frequency signal (e.g., Tx1_LTE)

output from the RFIC 530 may be input to the first amplifier 610 without passing through the filter 330.

When the output path of the signal output from the first switch 310 is configured as the second output port 384 and the third switch 353 is turned on, the induced second radio frequency signal (e.g., Tx2_LTE) and the third radio frequency signal (e.g., Tx1_NR) output from the RFIC 530 may pass through the filter 330 and be input to the second amplifier 620. The induced second radio frequency signal (e.g., Tx2_LTE) may be removed through the filter 330, and the third radio frequency signal (e.g., Tx1_NR) may be input to the second amplifier 620. When the output path of the signal output from the first switch 310 is configured as the third output port 385 and the third switch 353 is turned off, the third radio frequency signal (e.g., Tx1_NR) output from the RFIC 530 may be input to the second amplifier 620 without passing through the filter 330.

FIG. 6B is a diagram illustrating an example configuration of an RFFE including a circuit including a notch filter according to various embodiments.

Referring to FIG. 6B, an RFFE 600 may include a circuit 300 (e.g., the circuit 300 of FIG. 3C), a first amplifier 610, a second amplifier 620, a first band switch BSW1 640, a second band switch BSW2 650, a first duplexer 661, a second duplexer 663, a third duplexer 665, an antenna switch 667, and/or an MIPI controller (e.g., MIPI #1 691 or MIPI #2 693). Since the description of the elements included in the RFFE 600 has been described in detail with reference to FIG. 5A, the detailed description may not be repeated.

According to various embodiments, the circuit 300 may include a first switch 310, a filter 330, a second switch 350, and/or a third switch 353.

According to various embodiments, the first switch 310 may perform control to transfer the first radio frequency signal, which is output from the RFIC 530, to the first amplifier 610 and transfer the third radio frequency signal, which is output from the RFIC 530, to the second amplifier 620. The filter 330 may include, for example, a notch filter. In an embodiment, when the filter 330 includes a notch filter, the second switch 350 and/or the third switch 353 may be connected to an output port of the first switch 310. In an embodiment, the first switch 310 may include a multi-input port or a multi-output port. For example, the multi-input port may be used for receiving a radio frequency signal output from the RFIC 530. The multi-input port may include a first input port 381 for reception of a first radio frequency signal (e.g., Tx1_LTE) from the RFIC 530 or a second input port 382 for reception of a third radio frequency signal (e.g., Tx1_NR) from the RFIC 530.

For example, the multi-output port may include a first output port 383 for input to the first amplifier 610 and a second output port 384 for input to the second amplifier 620. A second switch 350 may be connected to the first output port 383 through which the first switch 350 and the first amplifier 610 are connected. The third switch 353 may be connected to the second output port 384 through which the first switch 350 and the second amplifier 620 are connected. The second switch 350 and the third switch 353 may be placed on a path through which the first amplifier 610 and the first output port 383 are connected and a path through which the second amplifier 620 and the second output port 384 are connected, respectively. The filter 330 may be connected to a path through which the second switch 350 and the third switch 353 are connected.

For example, when both the second switch 350 and/or the third switch 353 are turned off, the filter 330 may not be connected to the output port of the first switch 310. The second switch 350 or the third switch 353 may be controlled under the control of the communication processor 510 (e.g., MIPI #1 691 and MIPI #2 693). For example, the second switch 350 may be turned on or off according to the control of the MIPI #1 691. The third switch 353 may be turned on or off according to the control of the MIPI #2 693.

According to various embodiments, the first switch 310 may control an output port connected to an input port under the control of a communication processor (e.g., a control circuit). The communication processor 510 may be configured to perform control such that the radio frequency signal is input to the first amplifier 610 or the second amplifier 620 by controlling the first switch 310 according to the frequency band of the radio frequency signal. For example, when the first radio frequency signal (Tx1_LTE) is output from the RFIC 530, the first switch 310 may connect the first input port 381 to the first output port 383 or the second output port 384. When the third radio frequency signal (Tx1_NR) is output from the RFIC 530, the first switch 310 may connect the second input port 382 to the first output port 383 or the second output port 384.

According to various embodiments, the communication processor 510 may be configured to control the second switch 350 or the third switch 353 based on whether transmission of the radio frequency signal corresponds to a configured condition. The configured condition may correspond to, for example, a case in which the first radio frequency signal (Tx1_LTE) and the fourth radio frequency signal (Tx2_NR) are simultaneously transmitted or a case in which the second radio frequency signal (Tx2_LTE) and the third radio frequency signal (Tx1_NR) are simultaneously transmitted. The communication processor 510 may be configured to turn on the second switch 350 or the third switch 353 when the radio frequency signal transmission corresponds to a configured condition. For example, the communication processor 510 may be configured to connect the first input port 381 to the first output port 383 and turn on the second switch 350.

As another example, the communication processor 510 may be configured to connect the first input port 381 to the second output port 384 and turn on the third switch 353. The communication processor 510 may be configured to connect the second input port 382 to the first output port 383 and turn on the second switch 350. As another example, the communication processor 510 may connect the second input port 382 to the second output port 384 and turn on the third switch 353. The communication processor 510 may turn off the second switch 350 and the third switch 353 when the radio frequency signal transmission does not correspond to a configured condition.

According to various embodiments, when the output path of the signal output from the first switch 310 is configured as the first output port 383, the second switch 350 is turned on, and the third switch 353 is turned off, the induced fourth radio frequency signal (e.g., Tx2_NR) among the induced fourth radio frequency signal (e.g., Tx2_NR) and the first radio frequency signal (e.g., Tx1_LTE) output from the RFIC 530 is removed through the filter 330, and the first radio frequency signal (e.g., Tx1_LTE) may be input to the first amplifier 610. When the output path of the signal output from the first switch 310 is configured as the first output port 383 and the second switch 350 is turned off, the first radio frequency signal (e.g., Tx1_LTE) output from the RFIC 530 may be input to the first amplifier 610 without passing through the filter 330.

When the output path of the signal output from the first switch 310 is configured as the second output port 384, the third switch 353 is turned on, and the second switch 350 is turned off, the induced second radio frequency signal (e.g., Tx2_LTE) among the induced second radio frequency signal (e.g., Tx2_LTE) and the third radio frequency signal (e.g., Tx1_NR) output from the RFIC 530 is removed through the filter 330 and the third radio frequency signal (e.g., Tx1_NR) may be input to the second amplifier 620. When the output path of the signal output from the first switch 310 is configured as the second output port 384 and the third switch 353 is turned off, the third radio frequency signal output from the RFIC 530 (e.g., Tx1_NR) may be input to the second amplifier 620 without passing through the filter 330.

Figure 7A:
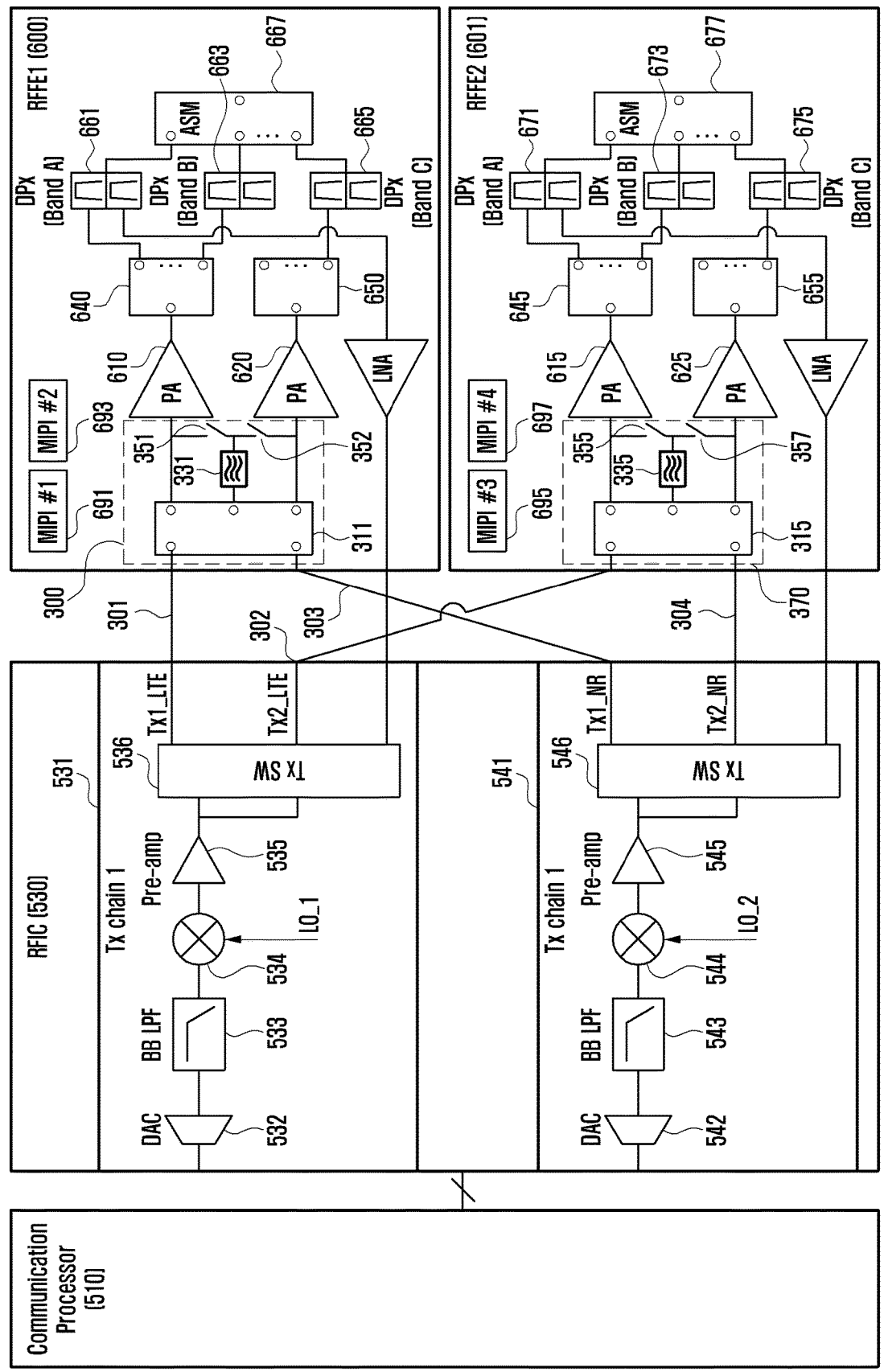
FIGS. 7A and 7B are diagrams illustrating example configurations of an electronic device including a circuit according to various embodiments.
Figure 7B:
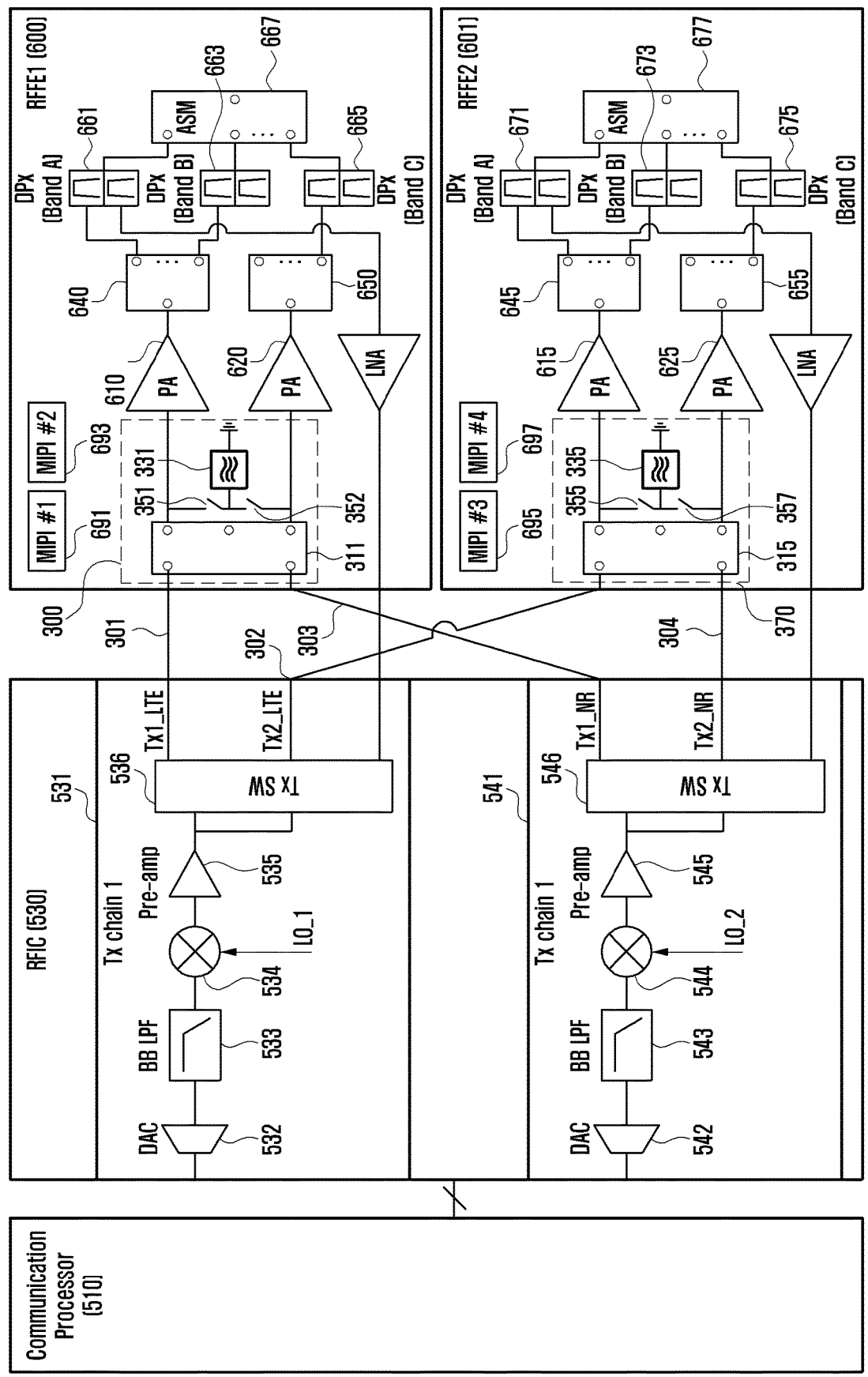

FIGS. 7A and 7B are diagrams illustrating example configurations of an electronic device including a circuit according to various embodiments.

FIG. 7A is a diagram illustrating an example configuration of an electronic device including a circuit including a band-pass filter according to various embodiments.

Referring to FIG. 7A, an electronic device (e.g., the electronic device 101 of FIG. 1) according to various embodiments may include a communication processor 510, an RFIC 530 (e.g., the first RFIC 222 of FIG. 2), RFFE 1 600 (e.g., the first RFFE 232 of FIG. 2), and/or RFFE 2 601 (e.g., the first RFFE 232 of FIG. 2). The RFFE 1 600 or RFFE 2 601 may be configured by, for example, one integrated circuit or chip (e.g., a single chip, or a single package). Since the communication processor 510, the RFIC 530, the RFFE 1 600, and the RFFE 2 601 have been described in detail with reference to FIG. 5A or 6A, the description may not be repeated.

According to various embodiments, the RFFE 1 600 may include a first circuit 300, a first amplifier 610, a second amplifier 620, a first band switch 640, a second band switch 650, a first duplexer 661, a second duplexer 663, a third duplexer 665, an antenna switch 667, and/or a MIPI controller (e.g., MIPI #1 691, MIPI #2 693). The first circuit 300 included in the RFFE 1 600 may include a (1-1)th switch 311 (e.g., the first switch 310 of FIG. 6A), a first filter 331 (e.g., the filter 330 of FIG. 6A), a (2-1)th switch 351 (e.g., the second switch 350 of FIG. 6A), or a (3-1)th switch 352 (e.g., the third switch 353 of FIG. 6A). The (1-1)th switch 311 may include, for example, a multi-input port or a multi-output port.

For example, the multi-input port may include a first input port for reception of a first radio frequency signal (e.g., Tx1_LTE) from the RFIC 530 (e.g., the first input port 381 of FIG. 6A) or a second input port (e.g., the second input port 382 of FIG. 6A) for reception of a third radio frequency signal (e.g., Tx1_NR) from the RFIC 530. For example, the multi-output port may include a first output port (e.g., the first output port 383 of FIG. 6A) for input to the first amplifier 610 without passing through the first filter 331, a second output port (e.g., the second output port 384 of FIG. 6A) passing through the first filter 331, and a third output port for input to the second amplifier 620 without passing through the first filter 331 (e.g., the third output port 385 of FIG. 6A).

According to various embodiments, the (1-1)th switch 311 may perform control to transfer the first radio frequency signal (Tx1_LTE), which is output from the RFIC 530, to the first amplifier 610 and to transfer the third radio frequency signal (Tx1_NR), which is output from the RFIC 530, to the second amplifier 620. As another example, the (1-1)th switch 311 may perform control to transfer the first radio frequency signal (Tx1_LTE) to the second amplifier 620 and transfer the third radio frequency signal (Tx1_NR) to the first amplifier 610. The communication processor 510 may be configured to control the (1-1)th switch 311 according to the frequency band of the radio frequency signal so as to control the radio frequency signal to be input to the first amplifier 610 or the second amplifier 620. The first filter 331 may include, for example, a band-pass filter or a low-pass filter.

According to various embodiments, the RFFE 2 601 may include a second circuit 370, a third amplifier 615, a fourth amplifier 625, a third band switch 645, a fourth band switch 655, a fourth duplexer 671, a fifth duplexer 673, a sixth duplexer 675, an antenna switch 677, and/or a MIPI controller (e.g., MIPI #3 695, MIPI #4 697). The second circuit 370 included in the RFFE 2 601 may include a (1-2)th switch 315, a second filter 335, a (2-2)th switch 355, or a (3-2)th switch 357. The (1-2)th switch 315 may include, for example, a multi-input port or a multi-output port.

For example, the multi-input port may include a first input port (e.g., the first input port 381 of FIG. 6A) for reception of a second radio frequency signal (e.g., Tx2_LTE) from the RFIC 530, or a second input port (e.g., the second input port 382 of FIG. 6A) for reception of a fourth radio frequency signal (e.g., Tx2_NR) from the RFIC 530. For example, the multi-output port may include a first output port for input to the third amplifier 615 without passing through the second filter 335 (e.g., the first output port 383 of FIG. 6A), the second output port (e.g., the second output port 384 of FIG. 6A) passing through the second filter 335, and the third output port (e.g., the third output port 385 of FIG. 6A) for input to the fourth amplifier 625 without passing through the second filter 335.

According to various embodiments, the (1-2)th switch 315 may perform control to transfer the second radio frequency signal (Tx2_LTE) output from the RFIC 530 to the third amplifier 615, and to transfer the fourth radio frequency signal (Tx2_NR) output from the RFIC 530 to the fourth amplifier 625. As another example, the (1-2)th switch 315 may perform control to transfer the second radio frequency signal (Tx2_LTE) to the fourth amplifier 625, and to transfer the fourth radio frequency signal (Tx2_NR) to the third amplifier 615. The communication processor 510 may be configured to control the (1-2)th switch 315 according to the frequency band of the radio frequency signal so as to control the radio frequency signal to be input to the third amplifier 615 or the fourth amplifier 625. The second filter 335 may include, for example, a band-pass filter or a low-pass filter. Under the control of the communication processor 510 (e.g., MIPI #3 695, MIPI #4 697), the (2-2)th switch 355 or the (3-2)th switch 357 may be controlled.

According to an embodiment, the communication processor 510 may be configured to control at least one of the (2-1)th switch 351, the (3-1)th switch 352, and the output path of the signal output from the (1-1)th switch 311, based on whether transmission of the radio frequency signal corresponds to a configured condition. When the transmission of the radio frequency signal corresponds to the configured condition, the communication processor 510 may be configured to configure the second output port 384 connected to the first filter 331 as the output path of the signal output from the (1-1)th switch 311, and to turn on the (2-1)th switch 351 or the (3-1)th switch 352. The communication processor 510 may be configured to determine a switch (e.g., a (2-1)th switch 351 or a (3-1)th switch 352) to be turned on based on a radio frequency band input to the RFFE 1 600. When the (2-1)th switch 351 is turned on and the (3-1)th switch 352 is turned off, the signal output from the (1-1)th switch 311 is input to the first amplifier 610, and when the (3-1)th switch 352 is turned on and the (2-1)th switch 351 is turned off, the signal output from the (1-1)th switch 311 may be input to the second amplifier 620.

For example, when the first radio frequency signal (Tx1_LTE) and the fourth radio frequency signal (Tx2_NR) are simultaneously transmitted (e.g., corresponding to a configured condition), the communication processor 510 may be configured to configure the second output port 384 connected to the first filter 331 as the output path of the signal output from the (1-1)th switch 311, and to turn off the (3-1)th switch 352 and turn on the (2-1)th switch 351 As another example, when the first radio frequency signal (Tx1_LTE) and the fourth radio frequency signal (Tx2_NR) are simultaneously transmitted (e.g., corresponding to a configured condition), the communication processor 510 may be configured to configure the second output port 384 connected to the first filter 331 as the output path of the signal output from the (1-1)th switch 311, and to turn off the (2-1)th switch 351 and turn on the (3-1)th switch 352 In an embodiment, the communication processor 510 may be configured to determine whether to turn on the (2-1)th switch 351 or turn on the (3-1)th switch 352 based on the frequency band of the first radio frequency signal (Tx1_LTE).

According to an embodiment, when the first radio frequency signal (Tx1_LTE) and the fourth radio frequency signal (Tx2_NR) are simultaneously transmitted, the fourth radio frequency signal (Tx2_NR) may be induced on the third communication path 303 and input to the (1-1)th switch 311. In this case, the first radio frequency signal (Tx1_LTE) and the induced fourth radio frequency signal (Tx2_NR) may be input to the (1-1)th switch 311. The communication processor 510 may be configured to connect the first input port 381 of the (1-1)th switch 311 to the second output port 384 of the (1-1)th switch 311, so as to remove the induced fourth radio frequency signal (Tx2_NR) through the first filter 331 among the first radio frequency signal (Tx1_LTE) and the induced fourth radio frequency signal (Tx2_NR) input to the (1-1)th switch 311. For example, when the first input port 381 of the (1-1)th switch 311 is connected to the second output port 384 of the (1-1)th switch 311 and the (2-1)th switch 351 is turned on and the (3-1)th switch 352 is turned off, the first radio frequency signal (Tx1_LTE) having passed through the first filter 331 may be input to the first amplifier 610. As another example, when the first input port 381 of the (1-1)th switch 311 is connected to the second output port 384 of the (1-1)th switch 311, and the (3-1)th switch 352 is turned on and the (2-1)th switch 351 is turned off, the first radio frequency signal (Tx1_LTE) having passed through the first filter 331 may be input to the second amplifier 620.

According to an embodiment, when the first radio frequency signal (Tx1_LTE) and the fourth radio frequency signal (Tx2_NR) are simultaneously transmitted (e.g., corresponding to a configured condition), the communication processor 510 may be configured to configure the second output port 384 connected to the second filter 335 as the output path of the signal output from the (1-2)th switch 315, and to turn on the (2-1)th switch 351 or the (3-1)th switch 352. The communication processor 510 may be configured to determine a switch (e.g., the (2-2)th switch 355 or the (3-2)th switch 357) to be turned on based on the frequency band of the radio frequency signal input to the RFFE 2 601. For example, when the output path of the signal output from the (1-2)th switch 315 is configured as the second output port 384 connected to the second filter 335, the (2-2)th switch 355 is turned on, and the (3-2)th switch 357 is turned off, the signal output from the (1-2)th switch 315 may be input to the third amplifier 615. When the output path of the signal output from the (1-2)th switch 315 is configured as the second output port 384 connected to the second filter 335, the (3-2)th switch 357 is turned on, and the (2-2)th switch 355 is turned off, the signal output from the (1-2)th switch 315 may be input to the fourth amplifier 625.

According to an embodiment, when the first radio frequency signal (Tx1_LTE) and the fourth radio frequency signal (Tx2_NR) are simultaneously transmitted, the first radio frequency signal (Tx1_LTE) may be induced on the second communication path 302 and input to the (1-2)th switch 315. In this case, the induced first radio frequency signal (Tx1_LTE) and the fourth radio frequency signal (Tx2_NR) may be input to the (1-2)th switch 315. The communication processor 510 may be configured to connect the second input port 382 of the (1-2)th switch 315 to the second output port 384 of the (1-2)th switch 315, so as to remove the induced first radio frequency signal (Tx1_LTE) through the second filter 335 among the induced first radio frequency signal (Tx1_LTE) and the fourth radio frequency signal (Tx2_NR) input to the (1-2)th switch 315.

For example, when the second input port 382 of the (1-2)th switch 315 is connected to the second output port 384 of the (1-2)th switch 315, and the (2-2)th switch 355 is turned on, the fourth radio frequency signal (Tx2_NR) having passed through the second filter 335 may be input to the third amplifier 615. As another example, when the second input port 382 of the (1-2)th switch 315 is connected to the second output port 384 of the (1-2)th switch 315, the (3-2)th switch 357 is turned on, and the (2-2)th switch 355 is turned off, the fourth radio frequency signal (Tx2_NR) having passed through the second filter 335 may be input to the fourth amplifier 625.

According to an embodiment, when the second radio frequency signal (Tx2_LTE) and the third radio frequency signal (Tx1_NR) are simultaneously transmitted (e.g., corresponding to a configured condition), the communication processor 510 may be configured to configure the second output port 384 connected to the first filter 331 as the output path of the signal output from the (1-1)th switch 311, and to turn on the (2-1)th switch 351 or the (3-1)th switch 352.

According to an embodiment, when the second radio frequency signal (Tx2_LTE) and the third radio frequency signal (Tx1_NR) are simultaneously transmitted, the second radio frequency signal (Tx2_LTE) may be induced on the first communication path 301 and input to the (1-1)th switch 311. In this case, the induced second radio frequency signal (Tx2_LTE) and the third radio frequency signal (Tx1_NR) may be input to the (1-1)th switch 311. The communication processor 510 may be configured to connect the second input port 382 of the (1-1)th switch 311 to the second output port 384 of the (1-1)th switch 311, so as to remove the induced second radio frequency signal (Tx2_LTE) through the first filter 331 among the third radio frequency signal (Tx1_NR) and the induced second radio frequency signal (Tx2_LTE) input to the (1-1)th switch 311.

For example, when the second input port 382 of the (1-1)th switch 311 is connected to the second output port 384 of the (1-1)th switch 311, the (2-1)th switch 351 is turned on, and the (3-1)th switch 352 is turned off, the third radio frequency signal (Tx1_NR) having passed through the first filter 331 may be input to the first amplifier 610. As another example, when the second input port 382 of the (1-1)th switch 311 is connected to the second output port 384 of the (1-1)th switch 311, the (3-1)th switch 352 is turned on, and the (2-1)th switch 351 is turned off, the third radio frequency signal (Tx1_NR) having passed through the first filter 331 may be input to the second amplifier 620.

According to an embodiment, when the second radio frequency signal (Tx2_LTE) and the third radio frequency signal (Tx1_NR) are simultaneously transmitted (e.g., corresponding to a configured condition), the communication processor 510 may be configured to configure the second output port 384 connected to the second filter 335 as the output path of the signal output from the (1-2)th switch 315, and to turn on or off the (2-1)th switch 351 or the (3-1)th switch 352.

According to an embodiment, when the second radio frequency signal (Tx2_LTE) and the third radio frequency signal (Tx1_NR) are simultaneously transmitted, the third radio frequency signal (Tx1_NR) may be induced on the fourth communication path 304 and input to the (1-2)th switch 315. In this case, the second radio frequency signal (Tx2_LTE) and the induced third radio frequency signal (Tx1_NR) may be input to the (1-2)th switch 315. The communication processor 510 may be configured to connect the first input port 381 of the (1-2)th switch 315 to the second output port 384 of the (1-2)th switch 315, so as to remove the induced third radio frequency signal (Tx1_NR) through the second filter 335 among the second radio frequency signal (Tx2_LTE) and the induced third radio frequency signal (Tx1_NR) input to the (1-2)th switch 315.

For example, when the first input port 381 of the (1-2)th switch 315 is connected to the second output port 384 of the (1-2)th switch 315, the (2-2)th switch 355 is turned on, and the (3-2)th switch 357 is turned off, the second radio frequency signal (Tx2_LTE) having passed through the second filter 335 may be input to the third amplifier 615. As another example, when the first input port 381 of the (1-2)th switch 315 is connected to the second output port 384 of the (1-2)th switch 315, the (3-2)th switch 357 is turned on, and the (2-2)th switch 355 is turned off, the second radio frequency signal (Tx2_LTE) having passed through the second filter 335 may be input to the fourth amplifier 625.

In an embodiment, when transmitting a first radio frequency signal (Tx1_LTE) or a third radio frequency signal (Tx1_NR) among the first radio frequency signal (Tx1_LTE), the second radio frequency signal (Tx2_LTE), the third radio frequency signal (Tx1_NR), or the fourth radio frequency signal (Tx2_NR) (e.g., not correspond to the configured condition), the communication processor 510 may be configured to configure the output path of a signal, which is output from the (1-1)th switch 311, as the first output port 383 for input to the first amplifier 610 or the third output port 385 for input to the second amplifier 620, and to turn off the (2-1)th switch 351 and the (3-1)th switch 352. For example, when only the first radio frequency signal (Tx1_LTE) is transmitted, there is no signal induced through the third communication path 303, and thus only the first radio frequency signal (Tx1_LTE) may be input to the (1-1)th switch 311.

Since there is no other signal acting as noise in the first radio frequency signal (Tx1_LTE), the communication processor 510 may be configured to connect the output path of the signal, which is output from the (1-1)th switch 311, to the first output port 383 and turn off the (2-1)th switch 351, so as to control the first radio frequency signal (Tx1_LTE), which is input to the (1-1)th switch 311, to be input as it is to the first amplifier 610 (e.g., bypassing the first filter 331).

As another example, the communication processor 510 may be configured to connect the output path of the signal, which is output from the (1-1)th switch 311, to the third output port 385 and turn off the (3-1)th switch 352, so as to control the first radio frequency signal (Tx1_LTE), which is input to the (1-1)th switch 311, to be input as it is to the second amplifier 620 (e.g., bypasses the first filter 331). For example, when only the third radio frequency signal (Tx1_NR) is transmitted, only the third radio frequency signal (Tx1_NR) may be input to the (1-1)th switch 311. Since there is no other signal acting as noise in the third radio frequency signal (Tx1_NR), the communication processor 510 may be configured to connect the output path of the signal, which is output from the (1-1)th switch 311, to the first output port 383 and turn off the (2-1)th switch 351, so as to control the third radio frequency signal (Tx1_NR), which is input to the (1-1)th switch 311, to be input as it is to the first amplifier 610 (e.g., bypassing the first filter 331). As another example, the communication processor 510 may be configured to connect the output path of the signal, which is output from the (1-1)th switch 311, to the third output port 385 and turn off the (3-1)th switch 352, so as to control the third radio frequency signal (Tx1_NR), which is input to the (1-1)th switch 311, to be input as it is to the second amplifier 620 (e.g., bypassing the first filter 331).

In an embodiment, when transmitting a second radio frequency signal (Tx2_LTE) or a fourth radio frequency signal (Tx2_NR) among the first radio frequency signal (Tx1_LTE), the second radio frequency signal (Tx2_LTE), the third radio frequency signal (Tx1_NR), or the fourth radio frequency signal (Tx2_NR), the communication processor 510 may be configured to configure the output path of a signal, which is output from the (1-2)th switch 315, as the first output port 383 for input to the third amplifier 615 or the third output port 385 for input to the fourth amplifier 625, and to turn off the (2-2)th switch 355 and the (3-2)th switch 357. For example, when only the fourth radio frequency signal (Tx2_NR) is transmitted, only the fourth radio frequency signal (Tx2_NR) may be input to the (1-2)th switch 315.

Since there is no other signal acting as noise in the fourth radio frequency signal (Tx2_NR), the communication processor 510 may be configured to connect the output path of the signal, which is output from the (1-2)th switch 315, to the first output port 383 and turn off the (2-2)th switch 355, so as to control the fourth radio frequency signal (Tx2_NR), which is input to the (1-2)th switch 315, to be input as it is to the third amplifier 615 (e.g., bypassing the second filter 335). As another example, the communication processor 510 may be configured to connect the output path of the signal, which is output from the (1-2)th switch 315, to the third output port 385 and turn off the (3-2)th switch 357, so as to control the fourth radio frequency signal (Tx2_NR), which is input to the (1-2)th switch 315, to be input as it is to the fourth amplifier 625 (e.g., bypassing the second filter 335).

For example, when only the second radio frequency signal (Tx2_LTE) is transmitted, there is no signal induced through the fourth communication path 304, and thus only the second radio frequency signal (Tx2_LTE) may be input to the (1-2)th switch 315. Since there is no other signal acting as noise in the second radio frequency signal (Tx2_LTE), the communication processor 510 may be configured to connect the output path of the signal, which is output from the (1-2)th switch 315, to the first output port 383 and turn off the (2-2)th switch 355, so as to control the fourth radio frequency signal (Tx2_NR), which is input to the (1-2)th switch 315, to be input as it is to the third amplifier 615 (e.g., bypassing the second filter 335). As another example, the communication processor 510 may be configured to connect the output path of the signal, which is output from the (1-2)th switch 315, to the third output port 385 and turn off the (3-2)th switch 357, so as to control the second radio frequency signal (Tx2_LTE), which is input to the (1-2)th switch 315, to be input as it is to the fourth amplifier 625 (e.g., bypassing the second filter 335).

FIG. 7B is a diagram illustrating an example configuration of an electronic device including a circuit including a notch filter according to various embodiments.

Referring to FIG. 7B, the electronic device 101 may include a communication processor 510, an RFIC 530, RFFE 1 600, and/or RFFE 2 601. Since the communication processor 510 and the RFIC 530 have been described in detail with reference to FIG. 5A, the description may not be repeated. In addition, the RFFE 1 600 and the RFFE 2 602 differ only in the configuration of the circuit (e.g., the circuit 300 of FIG. 3C), and the description of the remaining elements is the same, so the description may not be repeated.

According to various embodiments, when the first filter 331 included in the RFFE 1 600 includes a notch filter, the first filter 331 may not be directly connected to the output port of the (1-1)th switch 311. For example, the first filter 331 may be connected to an output port of the (1-1)th switch 311 when the (2-1)th switch 351 and/or the (3-1)th switch 352 is turned on. As another example, when both of the (2-1)th switch 351 and/or the (3-1)th switch 352 are turned off, the first filter 331 may not be connected to the output port of the (1-1)th switch 311.

According to various embodiments, the (1-1)th switch 311 may include a multi-input port or a multi-output port. For example, the multi-input port may include a first input port 381 for reception of the first radio frequency signal (Tx1_LTE) from the RFIC 530 (e.g., connected to the first communication path 301) or a second input port 382 for reception of a third radio frequency signal (e.g., Tx1_NR) from the RFIC 530 (e.g., connected to the third communication path 303). For example, the multi-output port may include a first output port 383 for input to the first amplifier 610 and a second output port 384 for input to the second amplifier 620.

The (2-1)th switch 351 may be connected to the first output port 383 through which the (1-1)th switch 311 and the first amplifier 610 are connected. The (3-1)th switch 352 may be connected to the second output port 384 through which the (1-1)th switch 311 and the second amplifier 620 are connected. The (2-1)th switch 351 and the (3-1)th switch 352 may be placed on a path connecting the path through which the first amplifier 610 and the first output port 383 are connected and a path through which the second amplifier 620 and the second output port 384 are connected. The first filter 331 may be connected to a path through which the (2-1)th switch 351 and the (3-1)th switch 352 are connected.

For example, when the (2-1)th switch 351 and/or the (3-1)th switch 352 are all turned off, the first filter 331 may not be connected to the output port of the (1-1)th switch 311. The (1-1)th switch 311 may selectively connect an input port and an output port under the control of the communication processor 510. The communication processor 510 may be configured to control the (1-1)th switch 311 according to the frequency band of the radio frequency signal so as to input the radio frequency signal to the first amplifier 610 or the second amplifier 620. For example, when the first radio frequency signal (Tx1_LTE) is output from the RFIC 530, the (1-1)th switch 311 may connect the first input port 381, which is connected to the first communication path 301, to the first output port 383 or the second output port 384. When the third radio frequency signal (Tx1_NR) is output from the RFIC 530, the (1-1)th switch 311 may connect the second input port 382 to the first output port 383 or the second output port 384.

When the second filter 335 included in the RFFE 2 601 includes a notch filter, the second filter 335 may not be directly connected to the output port of the (1-2)th switch 315. For example, the second filter 335 may be connected to the output port of the (1-2)th switch 315 when the (2-2)th switch 355 and/or the (3-2)th switch 357 are turned on. As another example, when the (2-2)th switch 355 and/or the (3-2)th switch 357 are all turned off, the second filter 335 may not be connected to the output port of the (1-2)th switch 315.

According to various embodiments, the (1-2)th switch 315 may include a multi-input port or a multi-output port. For example, the multi-input port may include a first input port 381 for reception of the second radio frequency signal (Tx2_LTE) from the RFIC 530 (e.g., connected to the second communication path 302) or a second input port 382 for reception of a fourth radio frequency signal (e.g., Tx2_NR) from the RFIC 530 (e.g., connected to the fourth communication path 304). For example, the multi-output port may include a first output port 383 for input to the third amplifier 615 and a second output port 384 for input to the fourth amplifier 625. The (2-2)th switch 355 may be connected to the first output port 383 through which the (1-2)th switch 315 and the third amplifier 615 are connected. The (3-2)th switch 357 may be connected to the second output port 384 through which the (1-2)th switch 315 and the fourth amplifier 625 are connected. The (2-2)th switch 355 and the (3-2)th switch 357 may be placed on a path through which the third amplifier 615 and the first output port 383 are connected and on a path through which the fourth amplifier 625 and the second output port 384 are connected. The second filter 335 may be connected to a path through which the (2-2)th switch 355 and the (3-2)th switch 357 are connected.

For example, when the (2-2)th switch 355 and/or the (3-2)th switch 357 are all turned off, the second filter 335 may not be connected to the output port of the (1-2)th switch 315. The (1-2)th switch 315 may control an output port connected to the input port under the control of the communication processor 510. The communication processor 510 may be configured to control the (1-2)th switch 315 according to the frequency band of the radio frequency signal so as to control the radio frequency signal to be input to the third amplifier 615 or the fourth amplifier 625. For example, when the second radio frequency signal (Tx21_LTE) is output from the RFIC 530, the (1-2)th switch 315 may connect the first input port 381 connected to the second communication path 302 to the first output port 383 or the second output port 384. When the fourth radio frequency signal (Tx2_NR) is output from the RFIC 530, the (1-2)th switch 315 may connect the second input port 382 to the first output port 383 or the second output port 384.

According to an embodiment, the communication processor 510 may be configured to control at least one of the (2-1)th switch 351 and the (3-1)th switch 352 based on whether transmission of the radio frequency signal corresponds to a configured condition. The communication processor 510 may be configured to turn on or off the (2-1)th switch 351 or the (3-1)th switch 352 when the transmission of the radio frequency signal corresponds to a configured condition. The communication processor 510 may be configured to determine a switch (e.g., the (2-1)th switch 351 or the (3-1)th switch 352) to be turned on or off based on the radio frequency band input to the RFFE 1 600. For example, when the output path of the signal, which is output from the (1-1)th switch 311, is configured as the first output port 383, the (2-1)th switch 351 is turned on, and the (3-1)th switch 352 is turned off, the signal output from the (1-1)th switch 311 may be input to the first amplifier 610. When the output path of the signal, which is output from the (1-1)th switch 311 is configured as the second output port 384, the (3-1)th switch 352 is turned on, and the (2-1)th switch 351 is turned off, the signal output from the (1-1)th switch 311 may be input to the second amplifier 620.

For example, when the first radio frequency signal (Tx1_LTE) and the fourth radio frequency signal (Tx2_NR) are simultaneously transmitted (e.g., corresponding to a configured condition), the communication processor 510 may be configured to configure, as the first output port 383, the output path of the signal output from the (1-1)th switch 311, and to turn off the (3-1)th switch 352 and turn on the (2-1)th switch 351. As another example, when the first radio frequency signal (Tx1_LTE) and the fourth radio frequency signal (Tx2_NR) are simultaneously transmitted (e.g., corresponding to a configured condition), the communication processor 510 may be configured to configure, as the second output port 384, the output path of the signal output from the (1-1)th switch 311, and to turn off the (2-1)th switch 351 and turn on the (3-1)th switch 352. The communication processor 510 may be configured to determine whether to turn on or off the (2-1)th switch 351 or to turn on or off the (3-1)th switch 352 based on the frequency band of the first radio frequency signal (Tx1_LTE).

According to an embodiment, when the first radio frequency signal (Tx1_LTE) and the fourth radio frequency signal (Tx2_NR) are simultaneously transmitted, the fourth radio frequency signal (Tx2_NR) may be induced on the third communication path 303 and input to the (1-1)th switch 311. In this case, the first radio frequency signal (Tx1_LTE) and the induced fourth radio frequency signal (Tx2_NR) may be input to the (1-1)th switch 311. The communication processor 510 may be configured to connect the first input port 381 of the (1-1)th switch 311 to the first output port 383 of the (1-1)th switch 311, and to turn on the (2-1)th switch 351 and turn off the (3-1)th switch 352, so as to remove the induced fourth radio frequency signal (Tx2_NR) through the first filter 331 among the first radio frequency signal (Tx1_LTE) and the induced fourth radio frequency signal (Tx2_NR) input to the (1-1)th switch 311.

For example, when the first input port 381 of the (1-1)th switch 311 is connected to the first output port 383 of the (1-1)th switch 311, the (2-1)th switch 351 is turned on, and the (3-1)th switch 352 is turned off, the induced fourth radio frequency signal (Tx2_NR) may be removed through the first filter 331, and the first radio frequency signal (Tx1_LTE) may be input to the first amplifier 610. As another example, when the first input port 381 of the (1-1)th switch 311 is connected to the second output port 384 of the (1-1)th switch 311, the (3-1)th switch 352 is turned on, and the (2-1)th switch 351 is turned off, the induced fourth radio frequency signal (Tx2_NR) may be removed through the first filter 331, and the first radio frequency signal (Tx1_LTE) may be input to the second amplifier 620.

According to an embodiment, when the first radio frequency signal (Tx1_LTE) and the fourth radio frequency signal (Tx2_NR) are simultaneously transmitted (e.g., corresponding to a configured condition), the communication processor 510 may be configured to configure the first output port 383 or the second output port 384 as the output path of the signal output from the (1-2)th switch 315, and to turn on or off the (2-2)th switch 355 or the (3-2)th switch 357. The communication processor 510 may be configured to determine a switch (e.g., the (2-2)th switch 355 or the (3-2)th switch 357) to be turned on or off based on the frequency band of the radio frequency signal input to the RFFE 2 601. For example, when the output path of the signal output from the (1-2)th switch 315 is configured as the first output port 383, the (2-2)th switch 355 is turned on, and the (3-2)th switch 357 is turned off, the signal output from the (1-2)th switch 315 may be input to the third amplifier 615. When the output path of the signal output from the (1-2)th switch 315 is configured as the second output port 384, the (3-2)th switch 357 is turned on, and the (2-2)th switch 355 is turned off, the signal output from the (1-2)th switch 315 may be input to the fourth amplifier 625.

According to an embodiment, when the first radio frequency signal (Tx1_LTE) and the fourth radio frequency signal (Tx2_NR) are simultaneously transmitted, the first radio frequency signal (Tx1_LTE) may be induced on the second communication path 302 and input to the (1-2)th switch 315. In this case, the induced first radio frequency signal (Tx1_LTE) and the fourth radio frequency signal (Tx2_NR) may be input to the (1-2)th switch 315. The communication processor 510 may be configured to configure the first output port 383 as the output path of the signal output from the (1-2)th switch 315, and to turn on the (2-2)th switch 355 and turn off the (3-2)th switch 357, so as to remove the induced first radio frequency signal (Tx1_LTE) through the second filter 335 among the induced first radio frequency signal (Tx1_LTE) and the fourth radio frequency signal (Tx2_NR) input to the (1-2)th switch 315.

For example, when the output path of the signal output from the (1-2)th switch 315 is configured as the first output port 383, the (2-2)th switch 355 is turned on, and the (3-2)th switch 357 is turned off, the induced first radio frequency signal (Tx1_LTE) may be removed through the second filter 335, and the fourth radio frequency signal (Tx2_NR) may be input to the third amplifier 615. As another example, the communication processor 510 may be configured to configure the second output port 384 as the output path of the signal output from the (1-2)th switch 315, and to turn on the (3-2)th switch 357 and turn off the (2-2)th switch, so as to remove the induced first radio frequency signal (Tx1_LTE) through the second filter 335 among the induced first radio frequency signal (Tx1_LTE) and the fourth radio frequency signal (Tx2_NR) input to the (1-2)th switch 315. For example, when an output path of the signal output from the (1-2)th switch 315 is configured as the second output port 384, the (3-2)th switch 357 is turned on, and the (2-2)th switch 355 is turned off, the induced first radio frequency signal (Tx1_LTE) may be removed through the second filter 335, and the fourth radio frequency signal (Tx2_NR) may be input to the fourth amplifier 625.

According to an embodiment, when the second radio frequency signal (Tx2_LTE) and the third radio frequency signal (Tx1_NR) are simultaneously transmitted (e.g., corresponding to a configured condition), the communication processor 510 may be configured to configure the first output port 383 or the second output port 384 as the output path of the signal output from (1-1)th switch 311, and to turn on or off the (2-1)th switch 351 or the (3-1)th switch 352. When the second radio frequency signal (Tx2_LTE) and the third radio frequency signal (Tx1_NR) are simultaneously transmitted, the second radio frequency signal (Tx2_LTE) may be induced on the first communication path 301 and input to the (1-1)th switch 311. In this case, the induced second radio frequency signal (Tx2_LTE) and the third radio frequency signal (Tx1_NR) may be input to the (1-1)th switch 311.

The communication processor 510 may be configured to remove the induced second frequency signal (Tx2_LTE) through the first filter 331 among the third radio frequency signal (Tx1_NR) and the induced second radio frequency signal (Tx2_LTE) input to the (1-1)th switch 311. When the output path of the signal output from the (1-1)th switch 311 is configured as the first output port 383, the (2-1)th switch 351 is turned on, and the (3-1)th switch 352 is turned off, the induced second radio frequency signal (Tx2_LTE) may be removed through the first filter 331, and the third radio frequency signal (Tx1_NR) may be input to the first amplifier 610.

As another example, the communication processor 510 may be configured to configure the second output port 384 as the output path of the signal output from the (1-1)th switch 311, and to turn on the (3-1)th switch 352 and turn off the (2-1)th switch 351, so as to remove the induced second radio frequency signal (Tx2_LTE) through the first filter 331 among the third radio frequency signal (Tx1_NR) and the induced second radio frequency signal (Tx2_LTE) input to the (1-1)th switch 311. When the output path of the signal output from the (1-1)th switch 311 is configured as the second output port 384, the (3-1)th switch 352 is turned on, and the (2-1)th switch 351 is turned off, the induced second radio frequency signal (Tx2_LTE) may be removed through the first filter 331, and the third radio frequency signal (Tx1_NR) may be input to the second amplifier 620.

According to an embodiment, when the second radio frequency signal (Tx2_LTE) and the third radio frequency signal (Tx1_NR) are simultaneously transmitted (e.g., corresponding to a configured condition), the communication processor 510 may be configured to configure the first output port 383 or the second output port 384 as the output path of the signal output from the (1-2)th switch 315, and to turn on or off the (2-2)th switch 355 or the (3-2)th switch 357. According to an embodiment, when the second radio frequency signal (Tx2_LTE) and the third radio frequency signal (Tx1_NR) are simultaneously transmitted, the third radio frequency signal (Tx1_NR) may be induced on the fourth communication path 304 and input to the (1-2)th switch 315. In this case, the second radio frequency signal (Tx2_LTE) and the induced third radio frequency signal (Tx1_NR) may be input to the (1-2)th switch 315.

The communication processor 510 may be configured to remove the induced third radio frequency signal (Tx1_NR) through the second filter 335 among the second radio frequency signal (Tx2_LTE) and the induced third radio frequency signal (Tx1_NR) input to the (1-2)th switch 315. When the output path of the signal output from the (1-2)th switch 315 is configured as the first output port 383, the (2-2)th switch 355 is turned on and the (3-2)th switch 357 is turned off, the induced third radio frequency signal (Tx1_NR) may be removed through the second filter 335, and the second radio frequency signal (Tx2_LTE) may be input to the third amplifier 615.

As another example, the communication processor 510 may be configured to configure the second output port 384 as the output path of the signal output from the (1-2)th switch 315, and to turn on the (3-2)th switch 357 and turn off the (2-2)th switch 355, so as to remove the induced third radio frequency signal (Tx1_NR) through the second filter 335 among the induced third radio frequency signal (Tx1_NR) and the second radio frequency signal (Tx2_LTE) input to the (1-2)th switch 315. When the output path of the signal output from the (1-2)th switch 315 is configured as the second output port 384, the (3-2)th switch 357 is turned on, and the (2-2)th switch 355 is turned off, the induced third radio frequency signal (Tx1_NR) may be removed through the second filter 335, and the second radio frequency signal (Tx2_LTE) may be input to the fourth amplifier 625.

In an embodiment, when one of a first radio frequency signal (Tx1_LTE), a second radio frequency signal (Tx2_LTE), a third radio frequency signal (Tx1_NR), or a fourth radio frequency signal (Tx2_NR) is transmitted (e.g., does not correspond to the configured condition), the communication processor 510 may be configured to configure first output port 383 or the second output port 384 as the output path of the signal output from the (1-1)th switch 311, and to turn off the (2-1)th switch 351 and the (3-1)th switch 352. For example, when only the first radio frequency signal (Tx1_LTE) is transmitted, there is no signal induced through the third communication path 303, and thus only the first radio frequency signal (Tx1_LTE) may be input to the (1-1)th switch 311.

Since there is no other signal acting as noise in the first radio frequency signal (Tx1_LTE), the communication processor 510 may be configured to connect the output path of the signal, which is output from the (1-1)th switch 311, to the first output port 383 and turn off the (2-1)th switch 351, so as to control the first radio frequency signal (Tx1_LTE), which is input to the (1-1)th switch 311, to be input as it is to the first amplifier 610 (e.g., bypassing the first filter 331). As another example, the communication processor 510 may be configured to connect the output path of the signal, which is output from the (1-1)th switch 311, to the second output port 384 and turn off the (3-1)th switch 352, so as to control the first radio frequency signal (Tx1_LTE), which is input to the (1-1)th switch 311, to be input as it is to the second amplifier 620 (e.g., bypassing the first filter 331).

In an embodiment, when one of a first radio frequency signal (Tx1_LTE), a second radio frequency signal (Tx2_LTE), a third radio frequency signal (Tx1_NR), or a fourth radio frequency signal (Tx2_NR) is transmitted, the communication processor 510 may be configured to configure the first output port 383 or the second output port 384 as the output path of the signal output from the (1-2)th switch 315, and to turn off the (2-2)th switch 355 and the (3-2)th switch 357. For example, when only the fourth radio frequency signal (Tx2_NR) is transmitted, there is no signal induced through the fourth communication path 304, and thus only the fourth radio frequency signal (Tx2_NR) may be input to the (1-2)th switch 315.

Since there is no other signal acting as noise in the fourth radio frequency signal (Tx2_NR), the communication processor 510 may be configured to connect the output path of the signal, which is output from the (1-2)th switch 315, to the first output port 383 and turn off the (2-2)th switch 355, so as to control the fourth radio frequency signal (Tx2_NR), which is input to the (1-2)th switch 315, to be input as it is to the third amplifier 615 (e.g., bypassing the second filter 335). As another example, the communication processor 510 may be configured to connect the output path of the signal, which is output from the (1-2)th switch 315, to the second output port 384 and turn off the (3-2)th switch 357, so as to control the fourth radio frequency signal (Tx2_NR), which is input to the (1-2)th switch 315, to be input as it is to the fourth amplifier 625 (e.g., bypassing the second filter 335).

Figure 8A:
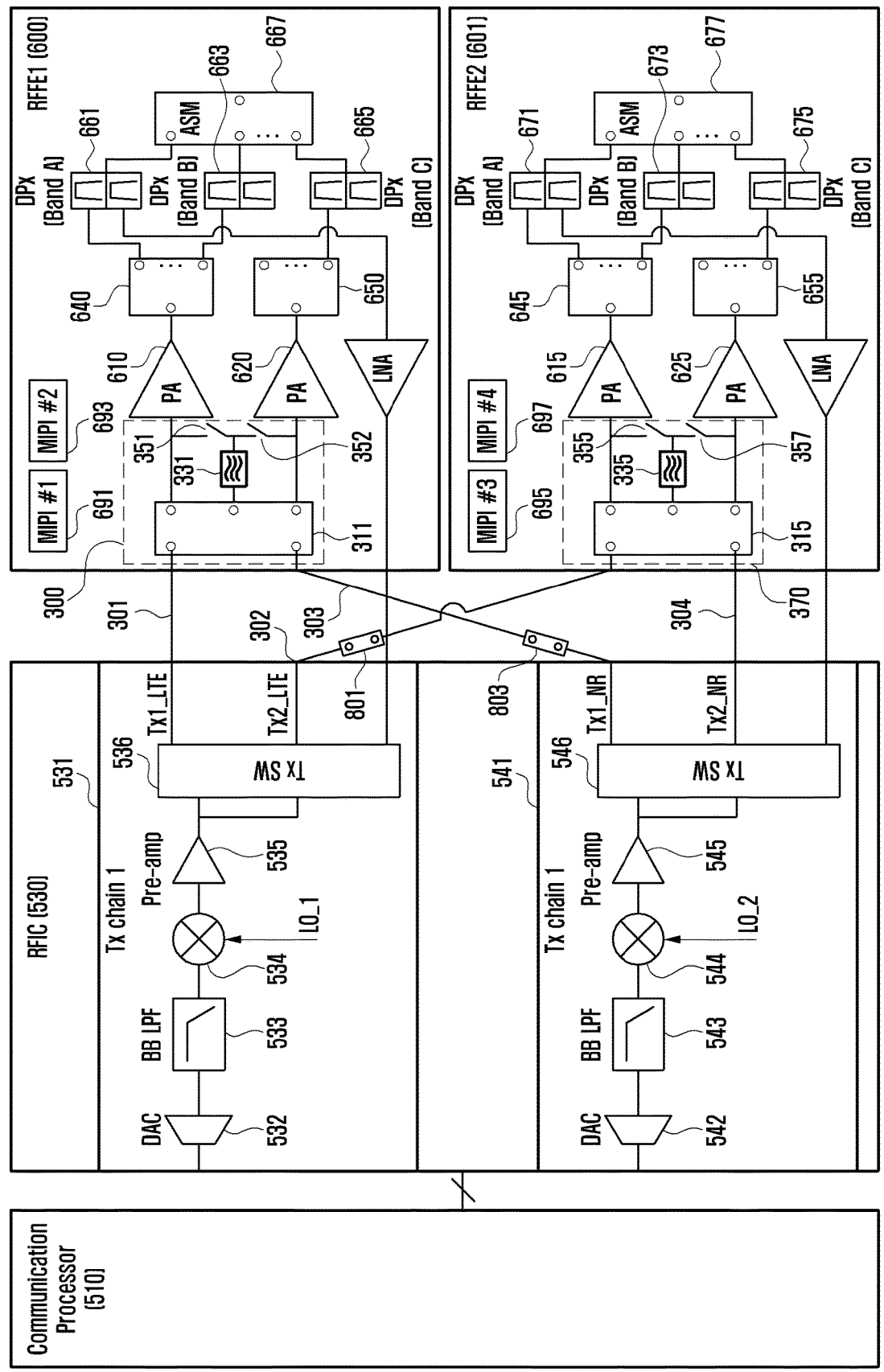
FIGS. 8A and 8B are diagrams illustrating example configurations of an electronic device including a circuit according to various embodiments.
Figure 8B:
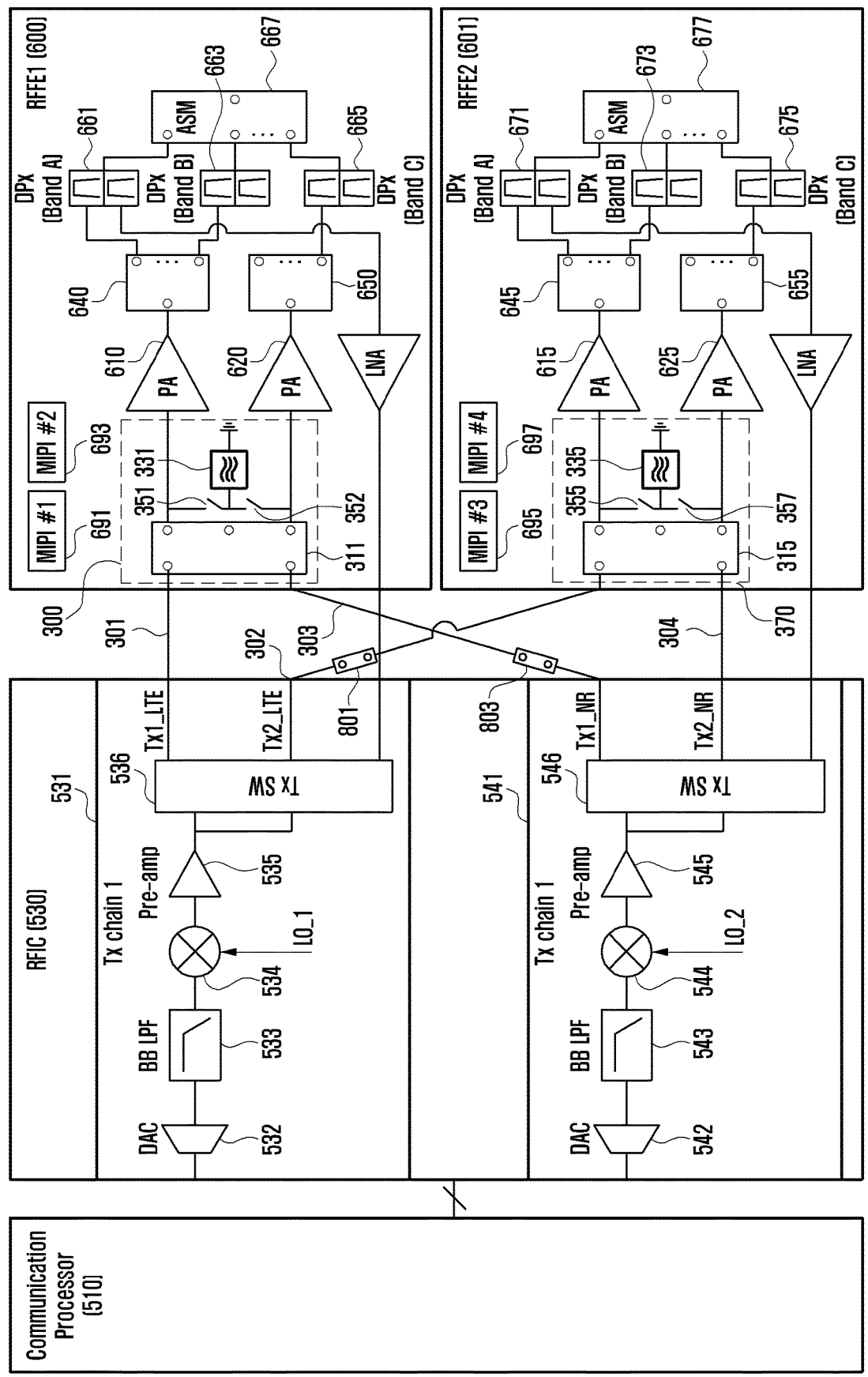

FIGS. 8A and 8B are diagrams illustrating an example configuration of an electronic device including a circuit according to various embodiments.

FIG. 8A is a diagram illustrating an example configuration of an electronic device including a circuit including a band-pass filter according to various embodiments.

Referring to FIG. 8A, when an electronic device (e.g., the electronic device 101 of FIG. 1) according to various embodiments is implemented such that a radio frequency signal output from an RFIC (e.g., the RFIC 530 of FIGS. 5A and 5B) is input to a plurality of amplifiers included in an RFFE (e.g., the RFFE 600 of FIG. 6A), it may be difficult to secure a designated isolation between each path. According to an embodiment, the electronic device 101 may include a switch circuit (e.g., a first switch circuit 801 or a second switch circuit 803) on the input path through which the signal output from the RFIC 530 is input to the RFFE (e.g., the RFFE 1 600 or the RFFE 2 601). For example, the first switch circuit 801 or the second switch circuit 803 may be placed in series in an input path for input to the RFFE 1 600 or the RFFE 2 601. FIG. 8A only further includes the first switch circuit 801 or the second switch circuit 803 with regard to the electronic device 101 of FIG. 7A, and the description of the remaining elements is substantially the same, and thus the description may not be repeated.

According to various embodiments, the first switch circuit 801 may be placed on a second communication path 302 through which the third radio frequency signal (e.g., Tx2_LTE), which is output from the RFIC 530, is input to the RFFE 2 601. In an embodiment, when the first radio frequency signal (Tx1_LTE) and the fourth radio frequency signal (Tx2_NR) are simultaneously transmitted (e.g., corresponding to a configured condition), the communication processor 510 may be configured to turn off the first switch circuit 801. According to various embodiments, the second switch circuit 803 may be placed on a third communication path 303 through which the third radio frequency signal (e.g., Tx1_NR), which is output from the RFIC 530, is input to the RFFE 1 600.

In an embodiment, when the first radio frequency signal (Tx1_LTE) and the fourth radio frequency signal (Tx2_NR) are simultaneously transmitted, the communication processor 510 may be configured to turn off the second switch circuit 803. As another example, when one of a first radio frequency signal (Tx1_LTE), a second radio frequency signal (Tx2_LTE), a third radio frequency signal (Tx1_NR), or a fourth radio frequency signal (Tx2_NR) is transmitted (e.g., not correspond to a configured condition), the communication processor 510 may be configured to turn on the first switch circuit 801 or the second switch circuit 803.

FIG. 8B is a diagram illustrating an example configuration of an electronic device including a circuit including a notch filter according to various embodiments.

Referring to FIG. 8B, the electronic device 101 may include a switch circuit (e.g., a first switch circuit 801 or a second switch circuit 803) on an input path through which the signal output from the RFIC 530 is input to the RFFE (e.g., the RFFE 1 600 or the RFFE 2 601). In an embodiment, when the first radio frequency signal (Tx1_LTE) and the fourth radio frequency signal (Tx2_NR) are simultaneously transmitted (e.g., corresponding to a configured condition), the communication processor 510 may be configured to turn off the first switch circuit 801 or the second switch circuit 803.

In an embodiment, when one of a first radio frequency signal (Tx1_LTE), a second radio frequency signal (Tx2_LTE), a third radio frequency signal (Tx1_NR), or a fourth radio frequency signal (Tx2_NR) is transmitted (e.g., not correspond to a configured condition), the communication processor 510 may be configured to turn on the first switch circuit 801 or the second switch circuit 803. FIG. 8B only further includes the first switch circuit 801 or the second switch circuit 803 with regard to the electronic device 101 of FIG. 7B, the description of the remaining elements is substantially the same as that of FIG. 7B, and thus the description may not be repeated. FIG. 8B is different only in that a filter included in a circuit includes a notch filter, and the remaining configuration may be substantially the same as that of FIG. 8A.

An electronic device (e.g., the electronic device 101 of FIG. 1) according to various example embodiments may include: a communication processor (e.g., the communication processor 510 of FIG. 5A or 5B); a radio frequency integrated circuit (RFIC) (e.g., the RFIC 530 of FIG. 5A or 5B) connected to the communication processor and configured to output at least one of: a first radio frequency signal, a second radio frequency signal, a third radio frequency signal, and a fourth radio frequency signal; a first circuit (e.g., the circuit 300 of FIGS. 3A to 3C) connected to the RFIC and including a first filter; a first radio frequency front end (RFFE) (e.g., the RFFE 1 550 of FIG. 5A or FIG. 5B) connected to the first circuit and including a first amplifier configured to amplify the first radio frequency signal and/or the third radio frequency signal; and a second RFFE (e.g., the RFFE 2 570 of FIG. 5A or FIG. 5B) including a second amplifier configured to amplify the second radio frequency signal and/or the fourth radio frequency signal output from the RFIC, wherein the communication processor is configured to control the first circuit to remove the fourth radio frequency signal induced to the first circuit, through the first filter.

The first circuit may be configured to be included in the first RFFE or disposed between the RFIC and the first RFFE.

The communication processor may be configured to perform control such that a signal, output from the first switch, is input to the first amplifier by bypassing the first filter, or is input to the first amplifier by passing through the first filter.

The first circuit may include a first switch and/or the first filter; the first switch may include a multi-input port or at least one output port; the multi-input port may include a first input port connected to a first communication path through which the first radio frequency signal is received from the RFIC, and a second input port connected to a third communication path through which the third radio frequency signal is received from the RFIC; and the first filter may be configured to remove the fourth radio frequency signal induced on the third communication path.

Based on the first filter being a band-pass filter or a low-pass filter, the output port of the first switch includes a first output port configured to pass through the first filter or a second output port configured to not pass through the first filter; the first filter is disposed in a communication path of the second output port; and the communication processor may be configured to configure an output path, through which the first radio frequency signal or the fourth radio frequency signal is output from the first switch, as the first output path configured to pass through the first filter or the second output path for bypassing the first filter.

The communication processor is configured to, based on the first radio frequency signal and the fourth radio frequency signal being simultaneously transmitted or the second radio frequency signal and the third radio frequency signal being simultaneously transmitted, configure the output path, through which the signal is output from the first switch, as the first output path, and based on one of the first radio frequency signal, the second radio frequency signal, the third radio frequency signal, and the fourth radio frequency signal being transmitted, configure the output path, through which the signal is output from the first switch, as the second output path.

Based on the filter being a notch filter, the first circuit further includes a second switch, and the second switch may be configured to be disposed on the path, connected to the output port of the first switch and used for input to the first amplifier.

The communication processor may be configured to control the second switch so that the signal, output from the first switch, is input to the first amplifier by bypassing the first filter, or the signal, which is output from the first switch, is input to the first amplifier by passing through the first filter.

The communication processor may be configured to, based on the first radio frequency signal and the fourth radio frequency signal being simultaneously transmitted or the second radio frequency signal and the third radio frequency signal being simultaneously transmitted, turn on the second switch to allow a part of the signal output from the first switch to be removed by the first filter and input to the first amplifier, and based on one of the first radio frequency signal, the second radio frequency signal, the third radio frequency signal, and the fourth radio frequency signal being transmitted, turn off the second switch to allow the signal output from the first switch to be input to the first amplifier.

The electronic device may further include a second circuit connected to the RFIC and including a second filter.

The second circuit includes a second switch and/or the second filter, the second switch includes a multi-input port or at least one output port, the multi-input port includes a first input port connected to a second communication path through which the second radio frequency signal is received from the RFIC, and a second input port connected to a fourth communication path through which the fourth radio frequency signal is received from the RFIC, and the second filter may be configured to remove the first radio frequency signal induced on the second communication path.

The communication processor may be configured to perform control such that the second radio frequency signal or the fourth radio frequency signal is input to the second amplifier by bypassing the second filter, or is input to the second amplifier by passing through the second filter.

An electronic device (e.g., the electronic device 101 of FIG. 1) according to various example embodiments may include: a communication processor (e.g., the communication processor 510 of FIG. 5A or 5B); an RFIC (e.g., the RFIC 530 of FIG. 5A or 5B) connected to the communication processor and configured to output at least one of: a first radio frequency signal, a second radio frequency signal, a third radio frequency signal, and a fourth radio frequency signal; a first circuit (e.g., the circuit 300 of FIGS. 3A to 3C) connected to the RFIC and including a first filter; a first RFFE (e.g., the RFFE 1 550 of FIG. 5A or FIG. 5B) connected to the first circuit and including a first amplifier and/or a second amplifier configured to amplify the first radio frequency signal and/or the third radio frequency signal; and a second RFFE (e.g., the RFFE 2 570 of FIG. 5A or FIG. 5B) including a third amplifier and/or a fourth amplifier configured to amplify the second radio frequency signal or the fourth radio frequency signal output from the RFIC, wherein the communication processor is configured to control the first circuit to remove the fourth radio frequency signal, induced to the first circuit, through the first filter.

The first circuit further includes a first switch, a first filter, a second switch, and/or a third switch; the first switch includes a multi-input port or at least one output port; the multi-input port includes a first input port connected to a first communication path through which the first radio frequency signal is received from the RFIC, and a second input port connected to a third communication path through which the third radio frequency signal is received from the RFIC; and the first filter may be configured to remove the fourth radio frequency signal which is induced on the third communication path.

The communication processor may be configured to, based on the first radio frequency signal and the fourth radio frequency signal being simultaneously transmitted or the second radio frequency signal and the third radio frequency signal being simultaneously transmitted, turn on the second switch to control the signal, output from the first switch, to be input to the first amplifier by passing through the first filter, or turn on the third switch to control the signal, output from the first switch, to be input to the second amplifier by passing through the first filter.

The communication processor may be configured to, based on one of the first radio frequency signal, the second radio frequency signal, the third radio frequency signal, and the fourth radio frequency signal being transmitted, turn off the second switch to control the signal, output from the first switch, to be input to the first amplifier by bypassing the first filter, or turn off the third switch to control the signal, output from the first switch, to be input to the second amplifier by bypassing through the first filter.

based on the first filter being a band pass filter or a low pass filter, the first filter may be configured to be connected to the output port of the first switch, and based on the first filter being a notch filter, the second switch or the third switch may be configured to be connected to the output port of the first switch.

The first filter implemented as the notch filter may be configured not to be connected to the output port of the first switch based on the second switch and the third switch being turned off, and the first filter may be configured to be connected to the output port of the first switch based on the second switch or the third switch being turned on.

The electronic device further includes a switch circuit on an input path through which the radio frequency signal, output from the RFIC, is input to the first RFFE, and the communication processor may be configured to control the switch circuit based on whether the first radio frequency signal and the fourth radio frequency signal are simultaneously transmitted or the second radio frequency signal and the third radio frequency signal are simultaneously transmitted.

The communication processor may be configured to turn off the switch circuit based on the first radio frequency signal and the fourth radio frequency signal or the second radio frequency signal and the third radio frequency signal being simultaneously transmitted, and to turn on the switch circuit based on one of the first radio frequency signal, the second radio frequency signal, the third radio frequency signal, and the fourth radio frequency signal being transmitted.

Figure 9:
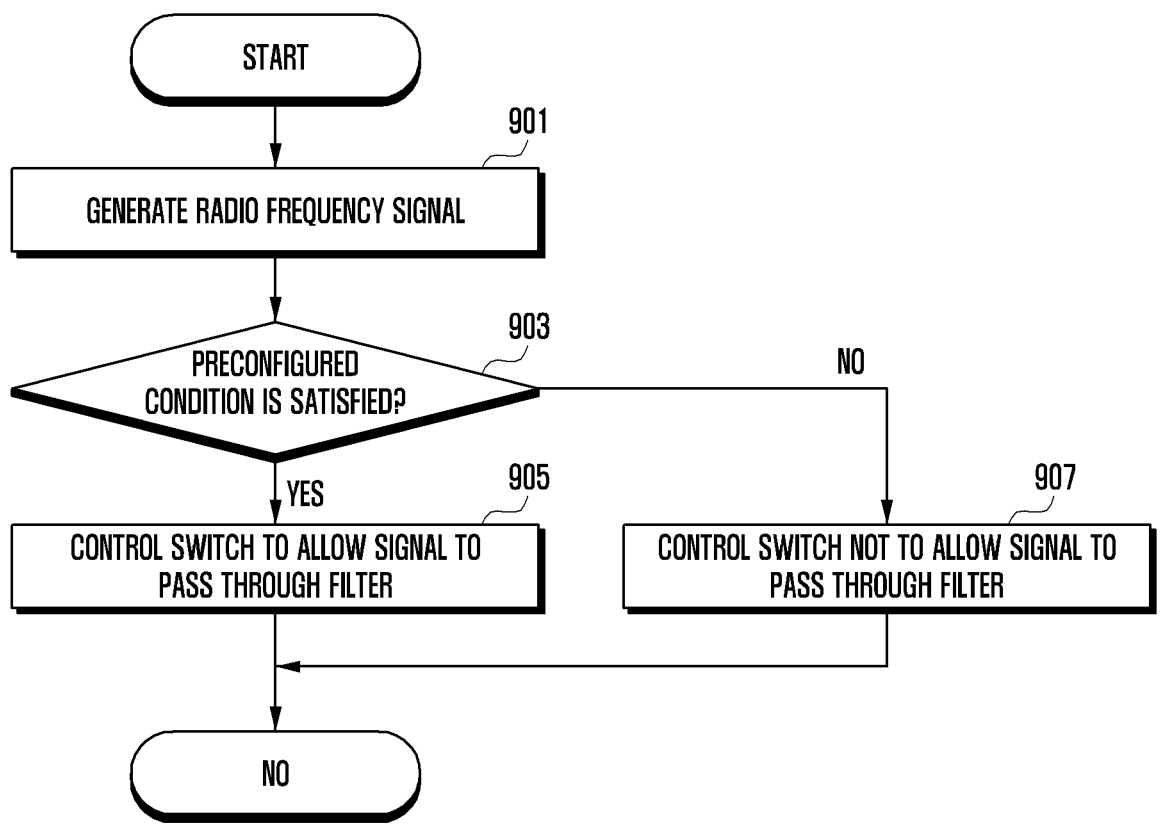
FIG. 9 is a flowchart illustrating an example method of operating an electronic device according to various embodiments.

FIG. 9 is a flowchart illustrating an example method of operating an electronic device according to various embodiments.

Referring to FIG. 9, in operation 901, a communication processor (e.g., the communication processor 510 of FIGS. 5A and 5B) of an electronic device (e.g., the electronic device 101 of FIG. 1) according to various embodiments may be configured to generate a radio frequency signal. The communication processor 510 may be configured to support establishment of a communication channel of a band to be used for wireless communication with a network (e.g., the network 199 of FIG. 1), and network communication through the established communication channel. According to various embodiments, the network may be a second generation (2G), 3G, 4G, long term evolution (LTE), or 5G network. The communication processor 510 may be configured to generate a radio frequency signal (e.g., a transmission signal) to be transmitted through an antenna (e.g., the antenna module 197 of FIG. 1) of the electronic device 101 and transfer the generated radio frequency signal to an RFIC (e.g., the RFIC 530 of FIGS. 5A and 5B).

In operation 903, the communication processor 510 may be configured to determine whether transmission of the radio frequency signal corresponds to a configured (e.g., specified) condition. The configured condition corresponds to an E-UTRA/NR dual connectivity (ENDC) scenario, and for example, may correspond to simultaneous transmission of two different transmission signals. The configured condition may correspond to, for example, a case in which the first radio frequency signal (Tx1_LTE) and the fourth radio frequency signal (Tx2_NR) are simultaneously transmitted or a case in which the second radio frequency signal (Tx2_LTE) and the third radio frequency signal (Tx1_NR) are simultaneously transmitted. The communication processor 510 may perform operation 905 when the configured condition is satisfied, and may perform operation 907 when the configured condition is not satisfied.

When the configured condition is satisfied, the communication processor 510 may be configured to control a switch to allow a signal to pass through the filter in operation 905. For example, when the RFFE (e.g., the RFFE 1 550) of the electronic device 101 is implemented as shown in FIG. 5A, the communication processor 510 may be configured to control the (1-1)th switch 311 included in the circuit 300 such that the output path of the (1-1)th switch 311 is configured to pass through the first filter 331. For example, the communication processor 510 may be configured to perform control such that the signal, which is output from the (1-1)th switch 311, to pass through the first filter 331, so as to remove an induced fourth radio frequency signal (Tx2_NR) through the first filter 330 among the induced fourth radio frequency signal (Tx2_NR) and the first radio frequency signal (Tx1_LTE) input to the (1-1)th switch 311. As another example, when the RFFE (e.g., the RFFE 1 550) of the electronic device 101 is implemented as shown in FIG. 5B, the communication processor 510 may be configured to turn on the (2-1)th switch 351 so as to remove the induced fourth radio frequency signal (Tx2_NR) through the first filter 330 among the induced fourth radio frequency signal (Tx2_NR) and the first radio frequency signal (Tx1_LTE) input to the (1-1)th switch 311.

According to various embodiments, when the RFFE (e.g., the RFFE 1 600) of the electronic device 101 is implemented as shown in FIG. 7A, the communication processor 510 may be configured to configure the second output port 384 connected to the first filter 331 as the output path of the signal output from the (1-1)th switch 311, and to turn or off the (2-1)th switch 351 or the (3-1)th switch 352. When the RFFE (e.g., the RFFE 1 600) of the electronic device 101 is implemented as shown in FIG. 7B, the communication processor 510 may be configured to turn on or off the (2-1)th switch 351 or the (3-1)th switch 352. According to various embodiments, when the RFFE (e.g., the RFFE 1 600) of the electronic device 101 is implemented as shown in FIG. 8A or FIG. 8B, the communication processor 510 may be configured to turn off the first switch circuit 801 or the second switch circuit 803.

When the configured condition is not satisfied, the communication processor 510 may be configured to control the switch so as not to allow the signal to pass through the filter in operation 907. For example, when the RFFE (e.g., the RFFE 1 550) of the electronic device 101 is implemented as shown in FIG. 5A, the communication processor 510 may be configured to control the (1-2)th switch 315 such that the output path of the signal, which is output from the (1-2)th switch 315, is configured to not pass through the first filter 331. For example, when only the first radio frequency signal (Tx1_LTE) is transmitted, there is no signal induced through the third communication path 303, and thus only the first radio frequency signal (Tx1_LTE) may be input to the (1-1)th switch 311. The second output path 307 may prevent/reduce the signal output from the (1-1)th switch 311 from passing through the first filter 331. Since there is no other signal acting as noise in the first radio frequency signal (Tx1_LTE), the communication processor 510 may be configured to perform control such that the first radio frequency signal (Tx1_LTE), which is input to the (1-1)th switch 311, is input as it is to the first amplifier 551 (e.g., bypassing the first filter 331).

As another example, when the RFFE (e.g., the RFFE 1 550) of the electronic device 101 is implemented as shown in FIG. 5B, the communication processor 510 may be configured to turn off the (2-1)th switch 351 (or the (2-2) switch 355). For example, when only the first radio frequency signal (Tx1_LTE) is transmitted, there is no signal induced through the third communication path 303, and thus only the first radio frequency signal (Tx1_LTE) may be input to the (1-1)th switch 311. Since there is no other signal acting as noise in the first radio frequency signal (Tx1_LTE), the communication processor 510 may be configured to perform control such that the first radio frequency signal (Tx1_LTE), which is input to the (1-1)th switch 311, is input as it is to the first amplifier 551 (e.g., bypassing the first filter 331).

According to various embodiments, when the RFFE (e.g., the RFFE 1 600) of the electronic device 101 is implemented as shown in FIG. 7A, the communication processor 510 may be configured to configure the first output port 383 connected to the first amplifier 610 or the second output port 384 connected to the second amplifier 620, as the output path of the signal output from the (1-1)th switch 311, and to turn off the (2-1)th switch 351 or the (3-1)th switch 352. When the RFFE (e.g., the RFFE 1 600) of the electronic device 101 is implemented as shown in FIG. 7B, the communication processor 510 may be configured to turn off the (2-1)th switch 351 or the (3-1)th switch 352. According to various embodiments, when the RFFE (e.g., the RFFE 1 600) of the electronic device 101 is implemented as shown in FIG. 8A or FIG. 8B, the communication processor 510 may be configured to turn on the first switch circuit 801 or the second switch circuit 803.

While the disclosure has been illustrated and described with reference to various example embodiments, it will be understood that the various example embodiments are intended to be illustrative, not limiting. It will be further understood by those skilled in the art that various changes in form and detail may be made without departing from the true spirit and full scope of the disclosure, including the appended claims and their equivalents. It will also be understood that any of the embodiment(s) described herein may be used in conjunction with any other embodiment(s) described herein.

What is claimed is:

1. An electronic device comprising:
a communication processor comprising communication processing circuitry;
a radio frequency integrated circuit (RFIC) connected to the communication processor and including a first transmission chain capable of outputting first radio frequency (RF) signals and second RF signals, and a second transmission chain capable of outputting third RF signals, and a fourth RF signals, wherein the first, second, third, and fourth RF signals are different signals;
a first radio frequency front end (RFFE) configured to receive the first RF signals and the third RF signals output from the RFIC, the first RFFE including a first amplifier configured to amplify the first RF signals and/or the third RF signals;
a second RFFE configured to receive the second RF signals and the fourth RF signals output from the RFIC, the second RFFE including a second amplifier configured to amplify the second RF signals and/or the fourth RF signals; and
first circuitry connected to the first amplifier and configured to receive the first RF signals and the third RF signals and including a first filter,
wherein the communication processor is configured to, when the first RF signals and the fourth RF signals are output simultaneously, control the first circuitry to remove, through the first filter, signals, induced by the fourth RF signals on a signal path to the first amplifier for the third RF signals.

2. The electronic device of claim 1, wherein the first circuitry is included in the first RFFE.

3. The electronic device of claim 1, wherein the first circuitry includes a first switch connected to the first amplifier and the communication processor is configured to perform control such that signals output from the first switch are input to the first amplifier by bypassing the first filter, or are input to the first amplifier by passing through the first filter.

4. The electronic device of claim 1, wherein the first circuitry comprises a first switch and a first filter,
wherein the first switch comprises a multi-input port and at least one output port, the multi-input port comprises a first input port connected to a first signal path for receiving the first RF signals from the RFIC, and a second input port connected to a third signal path for receiving the third RF signals from the RFIC, and
wherein the communication processor is configured to, when the first RF signals and the fourth RF signals are output simultaneously, control the first switch so that the signals induced on the third signal path are removed through the first filter.

5. The electronic device of claim 4, wherein the first filter comprises a band-pass filter or a low-pass filter and, the at least one output port of the first switch comprises a first output port connected to the first amplifier via the first filter and a second output port connected to the first amplifier and bypassing the first filter, and
wherein the communication processor is configured to control the first switch so that signals output from the first switch either pass through or bypass the first filter.

6. The electronic device of claim 5, wherein the communication processor is configured to:
based on the first RF signals and the fourth RF signals being simultaneously transmitted or the second RF signals and the third RF signals being simultaneously transmitted, control the first switch so that the signals is output from the first switch pass through the first filter, as the first output path; and
based on one of the first RF signals, the second RF signals, the third RF signals, and the fourth RF signals being transmitted, control the first switch so that configure the output path, through the signals output from the first switch bypass the first filter.

7. The electronic device of claim 4, wherein the first filter comprises a notch filter and, the first circuitry comprises a second switch, and
wherein the second switch is disposed on a signal path between; the first switch and the first amplifier.

8. The electronic device of claim 7, wherein the communication processor is configured to control the second switch so that signals, output from the first switch, are input to the first amplifier by bypassing the first filter, or the signals, output from the first switch, are input to the first amplifier by passing through the first filter.

9. The electronic device of claim 7, wherein the communication processor is configured to:
based on the first RF signals and the fourth RF signals being simultaneously output or the second RF signals and the third RF signals being simultaneously output, turn on the second switch to allow a part of the signals output from the first switch to be removed by the first filter and input to the first amplifier; and
based on one of the first RF signals, the second RF signals, the third RF signals, or the fourth RF signals being output, turn off the second switch to allow the signals output from the first switch to be input to the first amplifier and bypass the first filter.

10. The electronic device of claim 1, further comprising a second circuitry configured to receive the second RF signals and the fourth RF signals and including a second filter.

11. The electronic device of claim 10, wherein the second circuitry further comprises a second switch and the second filter,
wherein the second switch comprises a multi-input port and at least one output port, and the multi-input port comprises a first input port connected to a second signal path for receiving the second RF signals from the RFIC, and a second input port connected to a fourth signal path for receiving the fourth RF signals from the RFIC, and
wherein the communication processor is configured to, when the second RF signals and the third RF signals are output simultaneously, control the second switch so that a signals induced on the second signal path are removed through the second filter.

12. The electronic device of claim 10, wherein the communication processor is configured to perform control such that the second RF signals or the fourth RF signals are input to the second amplifier by bypassing the second filter, or are input to the second amplifier by passing through the second filter.

13. The electronic device of claim 1, wherein the second amplifier is included in the first RFFE,
wherein the second RFFE comprises a third amplifier and/or a fourth amplifier configured to amplify the second RF signals and/or the fourth RF signals output from the RFIC,
wherein the first circuitry further comprises a first switch, a first filter, a second switch, and/or a third switch,
wherein the first switch comprises a multi-input port or at least one output port, the multi-input port comprises a first input port connected to a first signal path for receiving the first RF signals from the RFIC, and a second input port connected to a third signal path for receiving the third RF signals from the RFIC, and wherein the communication processor is configured to, when the first RF signals and the fourth RF signals are output simultaneously, control the first switch so that the signals induced on the third signal path are removed through the first filter.

14. The electronic device of claim 13, wherein based on the first RF signals and the fourth RF signals being simultaneously transmitted or the second RF signals and the third RF signals being simultaneously transmitted, the communication processor is configured to turn on the second switch to control signals, output from the first switch, to be input to the first amplifier by passing through the first filter, or turn on the third switch to control the signals, output from the first switch, to be input to the second amplifier by passing through the first filter.

15. The electronic device of claim 13, wherein based on one of the first RF signals, the second RF signals, the third RF signals, and the fourth RF signals being transmitted, the communication processor is configured to turn off the second switch to control signals, output from the first switch, to be input to the first amplifier by bypassing the first filter, or turn off the third switch to control the signals, output from the first switch, to be input to the second amplifier by bypassing through the first filter.

16. The electronic device of claim 13, wherein, when the first filter is implemented as a band pass filter or a low pass filter, the first filter is configured to be connected to the output port of the first switch, and, when the first filter is implemented as a notch filter, the second switch or the third switch is configured to be connected to the output port of the first switch.

17. The electronic device of claim 13, wherein the first filter comprises a notch filter and is not connected to the output port of the first switch when the second switch and the third switch are turned off, and the first filter is configured to be connected to the output port of the first switch when the second switch or the third switch is turned on.

18. The electronic device of claim 13, further comprising a switch circuitry on an input path through which RF signals, output from the RFIC, are input to the first RFFE, and the communication processor is configured to control the switch circuitry based on whether the first RF signals and the fourth RF signals are simultaneously transmitted or the second RF signals and the third RF signals are simultaneously transmitted.

19. The electronic device of claim 18, wherein the communication processor is configured to turn off the switch circuitry when the first RF signals and the fourth RF signals or the second RF signals and the third RF signals are simultaneously transmitted, and to turn on the switch circuitry when one of the first RF signals, the second RF signals, the third RF signals, or the fourth RF signals are transmitted.

20. The electronic device of claim 1, wherein the first circuitry is disposed between the RFIC and the first RFFE.

* * * * *